(12) United States Patent
Su

(10) Patent No.: US 12,259,233 B2
(45) Date of Patent: Mar. 25, 2025

(54) METHOD FOR ALIGNING CALIBRATION DEVICE WITH VEHICLE BASED ON WHEEL ALIGNER AND CALIBRATION SYSTEM

(71) Applicant: AUTEL INTELLIGENT TECHNOLOGY CORP., LTD., Guangdong (CN)

(72) Inventor: Yixiong Su, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 973 days.

(21) Appl. No.: 17/331,882

(22) Filed: May 27, 2021

(65) Prior Publication Data

US 2021/0285760 A1  Sep. 16, 2021

Related U.S. Application Data

(63) Continuation of application No. PCT/CN2019/128648, filed on Dec. 26, 2019.

(30) Foreign Application Priority Data

Dec. 27, 2018  (CN) .......................... 201811611372.2

(51) Int. Cl.
*G01B 11/00* (2006.01)
*G01B 11/275* (2006.01)
(Continued)

(52) U.S. Cl.
CPC ............ *G01B 11/2755* (2013.01); *G06T 7/74* (2017.01); *H04N 23/90* (2023.01); *G01B 2210/143* (2013.01); *G01B 2210/303* (2013.01)

(58) Field of Classification Search
USPC ....................................................... 356/139.9
See application file for complete search history.

(56) References Cited

U.S. PATENT DOCUMENTS 6,823,601 B2 † 11/2004 Murray
7,382,913 B2 †  6/2008 Dorranc
(Continued)

FOREIGN PATENT DOCUMENTS

| CN | 101707890 A | 5/2010 |
|---|---|---|
| CN | 103250069 A | 8/2013 |

OTHER PUBLICATIONS

Annotated 3rd Party Submission References.*
(Continued)

*Primary Examiner* — James R Hulka
(74) *Attorney, Agent, or Firm* — Frank Gao, Esq.

(57) ABSTRACT

A method for aligning a calibration device with a vehicle based on a wheel aligner and a calibration system are provided. The wheel aligner includes an image sensor and a computer. The computer controls at least one image sensor to image a vehicle-mounted target on a vehicle, and processes the obtained image to determine a position of the vehicle. The computer controls the at least one image sensor to image a reference target on a calibration device, and processes the obtained image to determine a position of the calibration device. The computer determines an adjusting mode of the calibration device according to the position of the vehicle and the position of the calibration device, so that the calibration device is aligned with the vehicle according to an anticipated position or direction. The method can guide an operator to accurately align the calibration device with the vehicle.

15 Claims, 12 Drawing Sheets

(51) Int. Cl.
    *G06T 7/73*           (2017.01)
    *H04N 23/90*        (2023.01)

(56)            References Cited

U.S. PATENT DOCUMENTS

| | | |
|---|---|---|
| 8,244,024 B2 † | 8/2012 | Dorrance |
| 10,989,624 B2 * | 4/2021 | Corghi ................. G01M 11/064 |
| 11,836,947 B2 * | 12/2023 | Corghi ................. H04N 17/002 |
| 2004/0049930 A1 | 3/2004 | Murray |
| 2005/0041847 A1 * | 2/2005 | Dorrance ........... G01B 11/2755 |
| | | 356/139.09 |
| 2008/0186383 A1 * | 8/2008 | Dorrance .................. G01S 5/16 |
| | | 348/148 |
| 2013/0325252 A1 | 12/2013 | Schommer et al. |
| 2020/0103308 A1 † | 4/2020 | Corghi |
| 2020/0105018 A1 † | 4/2020 | Corghi |

OTHER PUBLICATIONS

International Search Report mailed Mar. 24, 2020; PCT/CN2019/128648 with English Translation.
Extended European Search Report dated Oct. 21, 2022; Appln. No. 19902819.2.

\* cited by examiner
† cited by third party

METHOD FOR ALIGNING CALIBRATION DEVICE WITH VEHICLE BASED ON WHEEL ALIGNER AND CALIBRATION SYSTEM

CROSS REFERENCE OF RELATED APPLICATIONS

This application is a continuation application of International Application No. PCT/CN2019/128648, filed on Dec. 26, 2019, which claims priority of Chinese Patent Application No. 201811611372.2, filed on Dec. 27, 2018, which are incorporated herein by reference in their entirety.

TECHNICAL FILED

The present application relates to the technical field of vehicle calibrations, and in particular, to a method for aligning a calibration device with a vehicle based on a wheel aligner and a calibration system.

BACKGROUND

An Advanced Driver Assistance System (ADAS) is an active safety technology of using various sensors mounted on a vehicle to immediately collect environmental data inside and outside the vehicle for technical processing such as identification, detection and tracking of static and dynamic articles, to enable a driver to be aware of possible dangers in the quickest time, to raise attention and improve safety. The sensors adopted by the ADAS mainly include cameras, radars, lasers, and ultrasound, etc., can detect light, heat, pressure, or other variables for monitoring vehicle states, and are generally located on front and rear bumpers, side-view mirrors, the inside of a steering stick, or a windshield of the vehicle.

During maintenance of the vehicle, calibration equipment is required to be placed right in front of or right behind the vehicle so that the calibration device is aligned with the vehicle, that is, a longitudinal center line of the vehicle is perpendicular to a transverse axis of the calibration device, and the longitudinal center line of the vehicle passes through a geometric center point of the calibration device, or the longitudinal center line of the vehicle overlaps a longitudinal center line of the calibration device. After the calibration device is aligned with the vehicle, the calibration device may install various calibration components, to calibrate sensors such as vehicle-mounted cameras, radars, lasers, or ultrasounds. However, the current alignment between the calibration device and the vehicle lacks assistance equipment, and as a result, the calibration operation is inconvenient and the accuracy is relatively low.

SUMMARY

To resolve the technical problems above, embodiments of the present disclosure are intended to provide a method for aligning a calibration device with a vehicle based on a wheel aligner and a calibration system, so that the calibration device can be conveniently and accurately aligned with the vehicle.

The embodiments of the present disclosure provide the following technical solutions to resolve the technical problems.

In one embodiment, a method for aligning a calibration device with a vehicle based on a wheel aligner is provided, wherein the wheel aligner includes at least one image sensor and a computer communicatively connected to the at least one image sensor; the method includes the following steps: controlling, by the computer, the at least one image sensor to image a vehicle-mounted target on the vehicle, and processing the obtained image to determine a position of the vehicle; controlling, by the computer, the at least one image sensor to image a reference target on the calibration device, and processing the obtained image to determine a position of the calibration device; and determining, by the computer, an adjusting mode of the calibration device based on the position of the vehicle and the position of the calibration device, so that the calibration device is aligned with the vehicle according to an anticipated position or direction.

Optionally, the at least one image sensor includes at least one first image sensors and at least one second image sensor; wherein the step of controlling, by the computer, the at least one image sensor to image a vehicle-mounted target on the vehicle, and processing the obtained image, to determine a position of the vehicle includes: controlling, by the computer, the at least one first image sensor to capture a first image the vehicle-mounted target on the vehicle, and processing the first image to determine the position of the vehicle; and the step of controlling, by the computer, the at least one image sensor to capture a second image from a reference target on the calibration device, and processing the second image to determine a position of the calibration device includes: controlling, by the computer, the at least one one second image sensor to image the reference target on the calibration device and process the obtained image, to determine the position of the calibration device.

Optionally, the wheel aligner includes a bracket; and the at least one first image sensor and the at least one second image sensor are mounted on the bracket.

Optionally, the at least one first image sensor is disposed at both ends of the bracket, and the at least one second image sensor is disposed in the middle of the bracket; and the reference target on the calibration device is disposed on the side of the calibration device departed from the vehicle and facing the bracket.

Optionally, the step of controlling, by the computer, the at least one second image sensor to capture a second image from the reference target on the calibration device, and processing the second image to determine the position of the calibration device includes: determining, by the computer, a position of a reference point in the second image of the reference target relative to the second image sensor; and determining, by the computer, a position of a center of the calibration device relative to the second image sensor according to the position of the reference point in the second image of the reference target relative to the second image sensor and a position correspondence between the reference point and a center of the calibration device.

Optionally, the step of controlling, by the computer, the at least one second image sensor to capture a second image from the reference target on the calibration device, and processing the second image to determine the position of the calibration device includes: controlling, by the computer, the at least one second image sensor to image different position states of the reference target on the calibration device to obtain at least two second images of the reference target; and determining a position of a transverse support shaft of the calibration device based on the at least two second images of the reference target, wherein the reference target presents different position states around the transverse support shaft of the calibration device, and the transverse support shaft of the calibration device is used to bear a calibration component.

Optionally, the step of controlling, by the computer, the at least one first image sensor to capture a first image the vehicle-mounted target on the vehicle, and processing the first image to determine the position of the vehicle includes: determining, by the computer, a position of the vehicle-mounted target relative to the first image sensor according to the first image of the on-mounted target; determining, by the computer, the position of the vehicle relative to the first image sensor according to the position of the on-mounted target relative to the first image sensor; and determining, by the computer, the position of the vehicle relative to the second image sensor according to the position of the vehicle relative to the first image sensor and the position of the first image sensor relative to the second image sensor.

Optionally, the wheel aligner includes a bracket, and the at least one image sensor is disposed at two ends of the bracket; and two ends of the transverse support shaft of the calibration device are respectively provided with two reference targets, and the transverse support shaft of the calibration device is used for bearing the calibration component.

Optionally, the step of controlling, by the computer, the at least one image sensor to image a reference target on the calibration device, and processing the obtained image to determine a position of the calibration device includes: determining, by the computer, positions of the reference targets on two ends of the transverse support shaft of the calibration device; and determining, by the computer, a center point of the calibration device and/or a position of the transverse support shaft of the calibration device according to the positions of the reference targets on the two ends.

Optionally, the step of determining, by the computer, a center point of the calibration device and/or a position of the transverse support shaft of the calibration device based on the positions of the reference targets on the two ends includes: determining, by the computer, positions of the two ends of the transverse support shaft o according to the positions of the reference targets on the two ends; and determining, by the computer, the center point of the calibration device and/or the position of the transverse support shaft according to the positions of the two ends of the transverse support shaft.

The embodiments of the present disclosure further adopt the following technical solution to resolve the technical problem.

In another embodiment, a calibration system is provided. The calibration system including: a wheel aligner which includes at least one image sensor and a computer communicatively connected to the at least one image sensor; and a calibration device, including a reference target; wherein: the computer is configured to control the at least one image sensor to image a vehicle-mounted target on a vehicle, and process the obtained image to determine a position of the vehicle; the computer is further configured to control the at least one image sensor to image a reference target on the calibration device, and process the obtained image to determine a position of the calibration device; and the computer is further configured to determine an adjusting mode of the calibration device based on the position of the vehicle and the position of the calibration device, so that the calibration device is aligned with the vehicle according to an anticipated position or direction.

Optionally, the wheel aligner includes a bracket; the at least one image sensor includes at least two first image sensors and at least one second image sensor; the at least two first image sensor are disposed at two ends of the bracket; the at least one second image sensor is disposed in the middle of the bracket; and the reference target on the calibration device is disposed on the side of the calibration device departed from the vehicle and facing the bracket.

Optionally, the wheel aligner includes a bracket; the two image sensors are respectively disposed at two ends of the bracket; a transverse support shaft of the calibration device is provided with a reference target; the transverse support shaft of the calibration device is configured to bear a calibration component; and the reference target presents different position states around the transverse support shaft of the calibration device.

Optionally, the wheel aligner includes a bracket; the two image sensors are respectively disposed at two ends of the bracket; two ends of a transverse support shaft of the calibration device are respectively provided with two reference targets, and the transverse support shaft of the calibration device is configured to bear a calibration component.

Optionally, the wheel aligner includes a bracket; the at least one image sensor is disposed at the bracket and is movable with respect to the bracket; and the reference target on the calibration device is disposed on the side of the calibration device departed from the vehicle and facing the bracket.

Optionally, the wheel aligner includes a bracket; the at least one image sensor is disposed at the bracket and is movable with respect to the bracket; a transverse support shaft of the calibration device is provided with a reference target; the transverse support shaft of the calibration device is configured to bear a calibration component; and the reference target presents different position states around the transverse support shaft of the calibration device.

Optionally, the wheel aligner includes a bracket; the at least one image sensor is disposed at the bracket and is movable with respect to the bracket; two ends of a transverse support shaft of the calibration device are respectively provided with two reference targets, and the transverse support shaft of the calibration device is configured to bear a calibration component.

As compared with the prior art, in the method for aligning a calibration device with a vehicle based on a wheel aligner provided by the embodiments of the present disclosure, the position of the vehicle and the position of the calibration device are determined by using the wheel aligner, and the computer determines the adjusting mode of the calibration device based on the position of the vehicle and the position of the calibration device and guides an operator to conveniently and accurately align the calibration device with the vehicle according to an anticipated position or direction.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following descriptions are merely some embodiments of the present disclosure, and a person of ordinary skill in the art may further obtain other accompanying drawings according to the accompanying drawings without creative efforts.

DETAILED DESCRIPTION

To make the objectives, technical solutions, and advantages of the present disclosure clearer and more comprehensible, the following further describes the present disclosure in detail with reference to the accompanying drawings and embodiments. It should be understood that the embodiments herein are provided for describing the present disclosure and not intended to limit the present disclosure.

In addition, technical features involved in different embodiments of the present disclosure described below may be combined together if there is no conflict.

Figure 1:
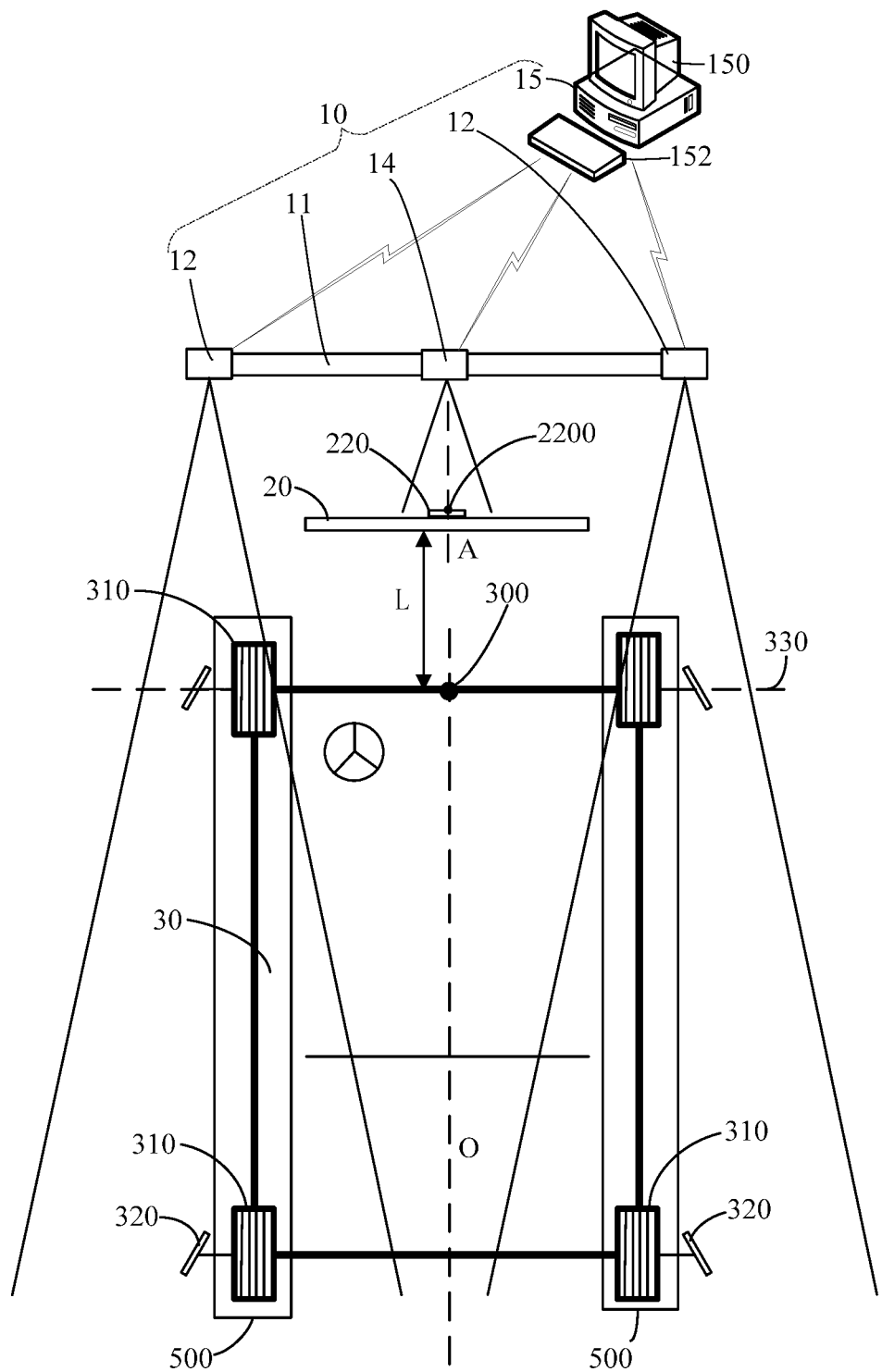
FIG. 1 is a scene diagram of a method for aligning a calibration device with a vehicle based on a wheel aligner provided by an embodiment of the present disclosure.

FIG. 1 is a scene diagram of a method for aligning a calibration device with a vehicle based on a wheel aligner provided by an embodiment of the present disclosure.

As shown in FIG. 1, the scene includes: a calibration system and a vehicle 30. The calibration system includes a wheel aligner 10 and a calibration device 20. The calibration device 20 is placed right in front of the vehicle 30, and the calibration device 20 is located between the wheel aligner 10 and the vehicle 30. The wheel aligner 10 is used for aligning the calibration device 20 with the vehicle 30 so that a calibration component installed on the calibration device 20 can calibrate vehicle-mounted equipment on the vehicle 30.

The wheel aligner 10 includes a support assembly 11, first image sensors 12, a second image sensor 14, and a computer 15. The first image sensors 12 and the second image sensor 14 are mounted on the support assembly 11, and the computer 15 may be communicatively connected to the first image sensors 12 and the second image sensor 14.

Figure 2:
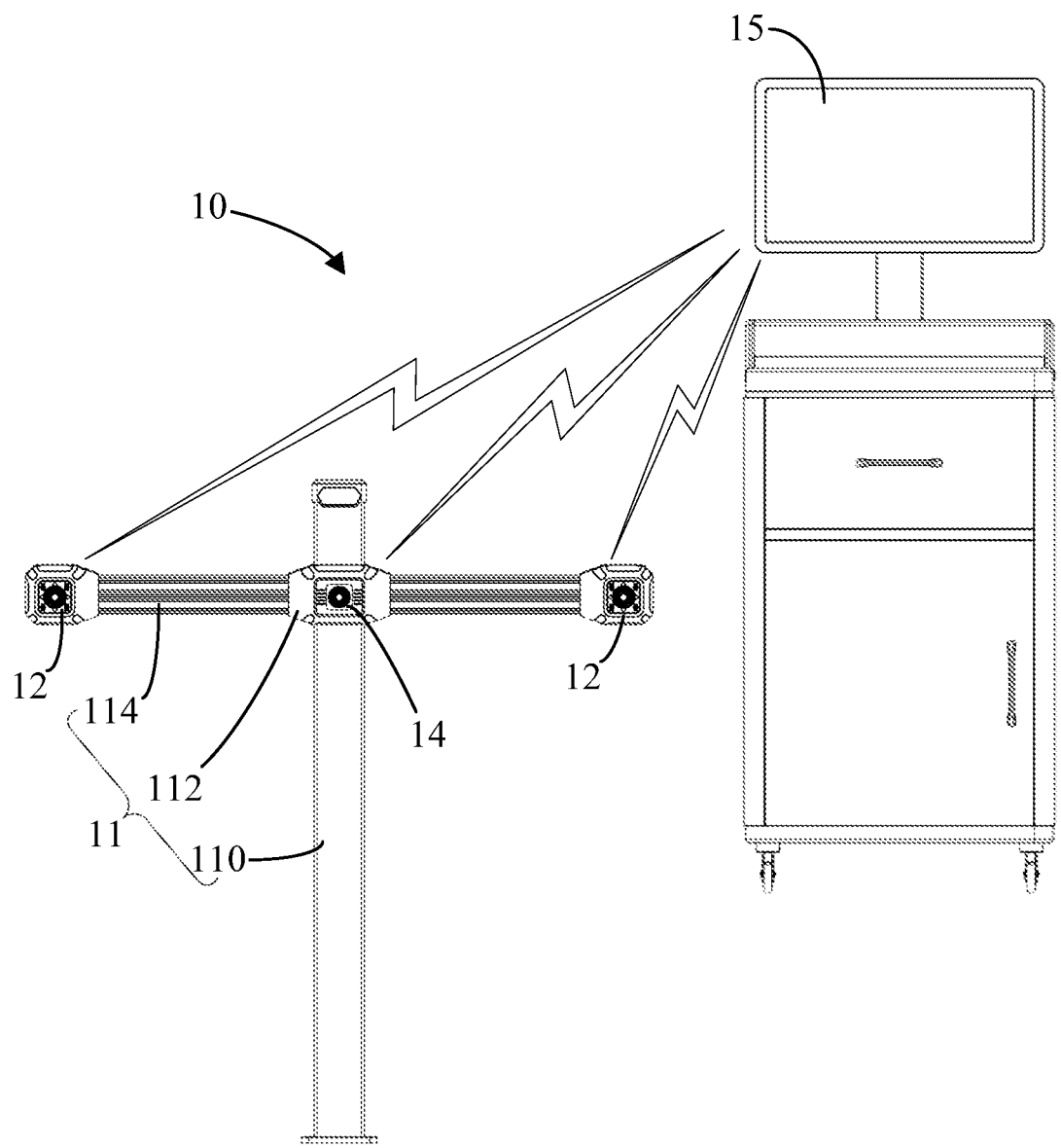
FIG. 2 is a schematic structural diagram of a wheel aligner provided by an embodiment of the present disclosure.
Figure 3:
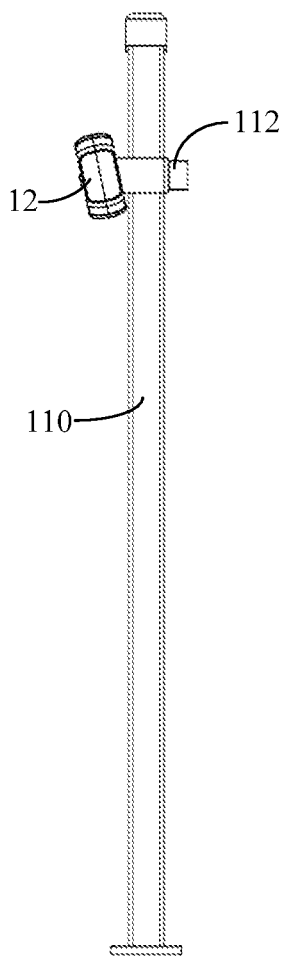
FIG. 3 is a schematic structural diagram of a support assembly of the wheel aligner as shown in FIG. 2.

Referring to FIG. 2 and FIG. 3, the support assembly 11 includes a stand column 110, a clamping member 112, and a bracket 114.

The stand column 110 may be fixed on the ground with four foundation bolts. The stand column 110 may also be supported at another type of base, as long as the stand column 110 remains stationary and can support the bracket 114.

The clamping member 112 is mounted at the stand column 110; the clamping member 112 may move along the stand column 110 with respect to the stand column 110. The clamping member 112 may be fixed at a desired horizontal height, for example, the clamping member 112 is sleeved on the stand column 110, the clamping member 112 includes a bolt, the bolt can be abutted against the stand column 110 so that the clamping member 112 is fixed at the stand column 110. The bolt can be screwed so as to be departed from the stand column 110, so that the clamping member 112 may move along the stand column 110 with respect to the stand column 110.

The bracket 114 is mounted at the clamping member 112; and the bracket 114 is of a columnar structure, and is perpendicular to the stand column 110.

In this embodiment, the bracket 114 is mounted at the stand column 110 through the clamping member 112. By using the clamping member 112, the bracket 114 may move with respect to the stand column 110, so as to facilitate adjusting the horizontal height thereof. As can be understood, in some other embodiments, the clamping member 112 may be omitted, the bracket 114 is directly mounted at the stand column 110, and by adjusting the horizontal height of the stand column 110, the horizontal height of the bracket 114 can be adjusted.

The first image sensors 12 and the second image sensor 14 are all mounted on the bracket 114, where the two first image sensors 12 are respectively located at two ends of the bracket 114, and the second image sensor 14 is located in the middle of the bracket 114. The first image sensors 12 and the second image sensor 14 may be any image sensor of a proper type, such as CCD-based or CMOS-based digital camera. Each of the first image sensors 12 and/or the second image sensor 14 includes a two-axial or triaxial gimbal, and can receive a control signal to adjust a photographing angle thereof; or each of the first image sensors 12 and/or the second image sensor 14 is fixedly mounted on the bracket; or each of the first image sensors 12 and/or the second image sensor 14 may adjust a photographing angle thereof to a specific photographing angle through a mechanic structure matching the bracket 114.

In this embodiment, the middle of the bracket 114 is any part between two ends of the bracket 114; the second image sensor 14 may be located at any position between the two first image sensors 12, for example, the second image sensor 14 is located between the two first image sensors 12, and the second image sensor 14 is separately away from the two first image sensors 12 by an equal distance.

The computer 15 may be communicatively connected to the first image sensors 12 and the second image sensor 14, for example, the computer 15 may be wiredly connected to the first image sensors 12 and the second image sensor 14 through a data line, or the computer 15 may be connected in wireless communication to the first image sensors 12 and the second image sensor 14 in a wireless communication mode such as WiFi and Bluetooth. The computer 15 may be a desktop computer, a laptop computer, a Personal Digital Assistant (PDA), a server, a smart phone, and other electronic devices having a computing function. The computer 15 includes a display 150 and an input control device 152 (referring to FIG. 1). The input control device 152 is used for inputting a user instruction, and may include a keyboard, a mouse, a touch tablet, and the like. The computer 15 is installed with graphics processing software, for example, SLAM software, for processing image information obtained from the first image sensor 12 and the second image sensor 14, simulating a three-dimensional graph, and displaying at the display 150 so as to guide an operator to execute a corresponding operation. Alternatively, the computer 15 further analyzes the processed image to determine, according to the image, the current position of the calibration device 20, to compare the current position and an anticipated position of the calibration device 20 and output an adjustment suggestion according to the comparison result. As can be understood, the image processing software in the embodiment of the present application may be image processing software self-made by a manufacturer for implementing the image processing function above, or may be commercially available image processing software. The embodiment of the present application does not limit the image processing software.

Figure 4:
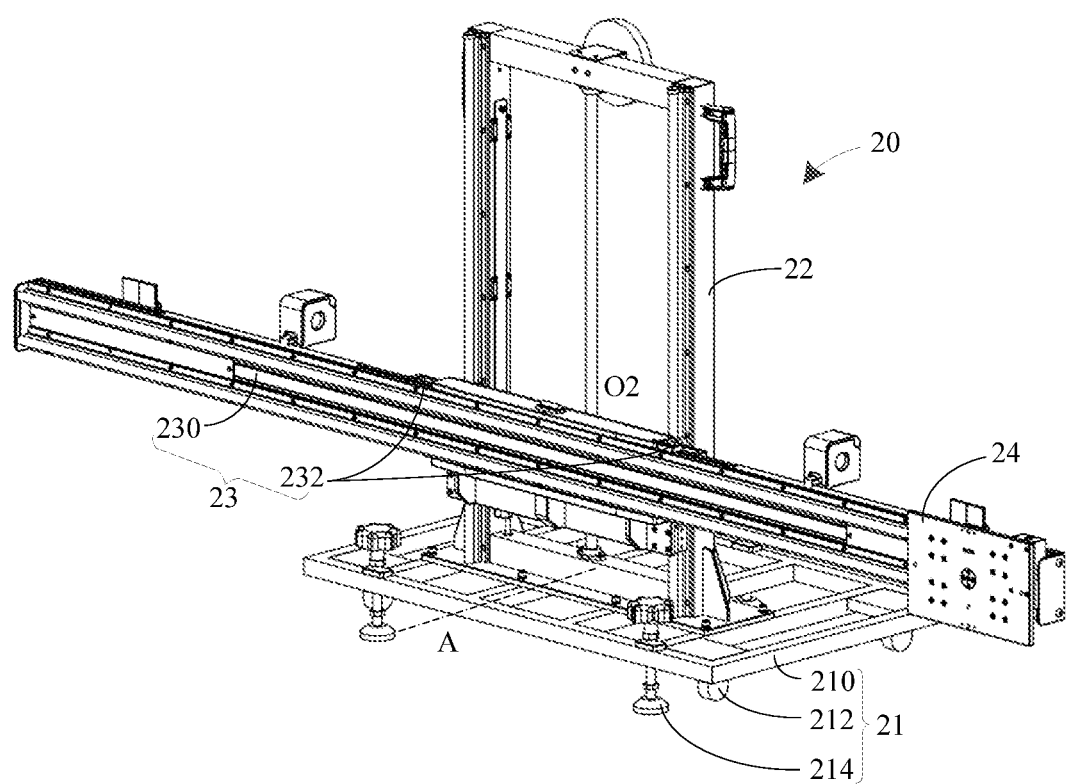
FIG. 4 is a schematic structural diagram of a calibration device provided by an embodiment of the present disclosure.

Referring to FIG. 4, the calibration device 20 includes a base bracket 21, a poling stent 22, a bracket assembly 23, and a sliding member 24.

One end of the poling stent 22 is connected to the base bracket 21, and the base bracket 21 supports the poling stent 22.

The bracket assembly 23 is mounted at the poling stent 22, and may move in a vertical direction with respect to the poling stent 22.

The sliding member 24 is mounted at the bracket assembly 23, and may move in a horizontal direction with respect to the bracket assembly 23.

The base bracket 21 includes a bracket body 210, rollers 212, and height adjusting members 214. The bracket body 210 is a rectangular flat panel and may be made of a metal material, and in order to reduce weight, a plurality of hollow regions are formed. The bracket body 210 has a central axis A which may be used as a longitudinal center line of the calibration device 20.

The rollers 212 are mounted at a bottom surface of the bracket body 210 for facilitate moving the base bracket 21. In this embodiment, the rollers 212 are universal moving rollers, so that the base bracket 21 may arbitrarily move front, back, left, and right; the number of the rollers 212 is four, and the rollers are respectively at four corners of the bracket body 210. As can be understood, in some other embodiments, the shape of the bracket body 210 may be changed according to actual requirements, rather than being limited as rectangle; for example, the bracket body 210 may be circular; the number of the rollers 212 may be increased or reduced according to actual requirements, as long as it is at least three.

The height adjusting members 214 are mounted at the bottom surface of the bracket body 210 for adjust the height of the bracket body 210. In this embodiment, the height adjusting members 214 are adjusting hand wheels, and the number thereof is three. The three adjusting hand wheels 214 are distributed in an isosceles triangle; two adjusting hand wheels 214 located at a bottom edge of the isosceles triangle are disposed at one side of the bracket body 210 and are symmetrically disposed with respect to the central axis A of the bracket body 210, and the other adjusting hand wheel 214 is disposed at the other side of the bracket body 210 and is disposed on the central axis A of the bracket body 210 (i.e., being disposed at the vertex position of a vertex angle of the isosceles triangle). Matching of the three adjusting hand wheels 214 may adjust a horizontal angle of the bracket body 210 as a whole. Separately adjusting the adjusting hand wheel 214 on the central axis A of the bracket body 210 may adjust a pitch angle of the bracket body 210.

As can be understood, the height adjusting members 214 may be other devices that can adjust the height; the number of the height adjusting members 214 may be increased according to actual requirements, as long as it is at least three.

The poling stent bracket 22 is perpendicular to a plane where the bracket body 210 is located.

The bracket assembly 23 includes a transverse support shaft 230 and a mounting base 232; the transverse support shaft 230 is mounted at the poling stent bracket 22 and the transverse support shaft 230 is horizontally disposed; and the mounting base 232 is mounted at the transverse support shaft 230 for mounting a calibration component.

The sliding member 24 is mounted at the transverse support shaft 230, and may move in a horizontal direction with respect to the transverse support shaft 230. In this embodiment, the sliding member 24 is movably mounted at the transverse support shaft 230 through a sliding bearing. The sliding member 24 includes a plurality of installation points for mounting the calibration component.

As can be understood, there are a plurality of modes for installing the calibration component on the transverse support shaft 230; in addition to slidably mounting the calibration component at the transverse support shaft 230, it can also be installed on the transverse support shaft 230 using a mounting member; with this regard, the embodiment of the present application does not limit the installation modes of the calibration component of the transverse support shaft 230.

Figure 5:
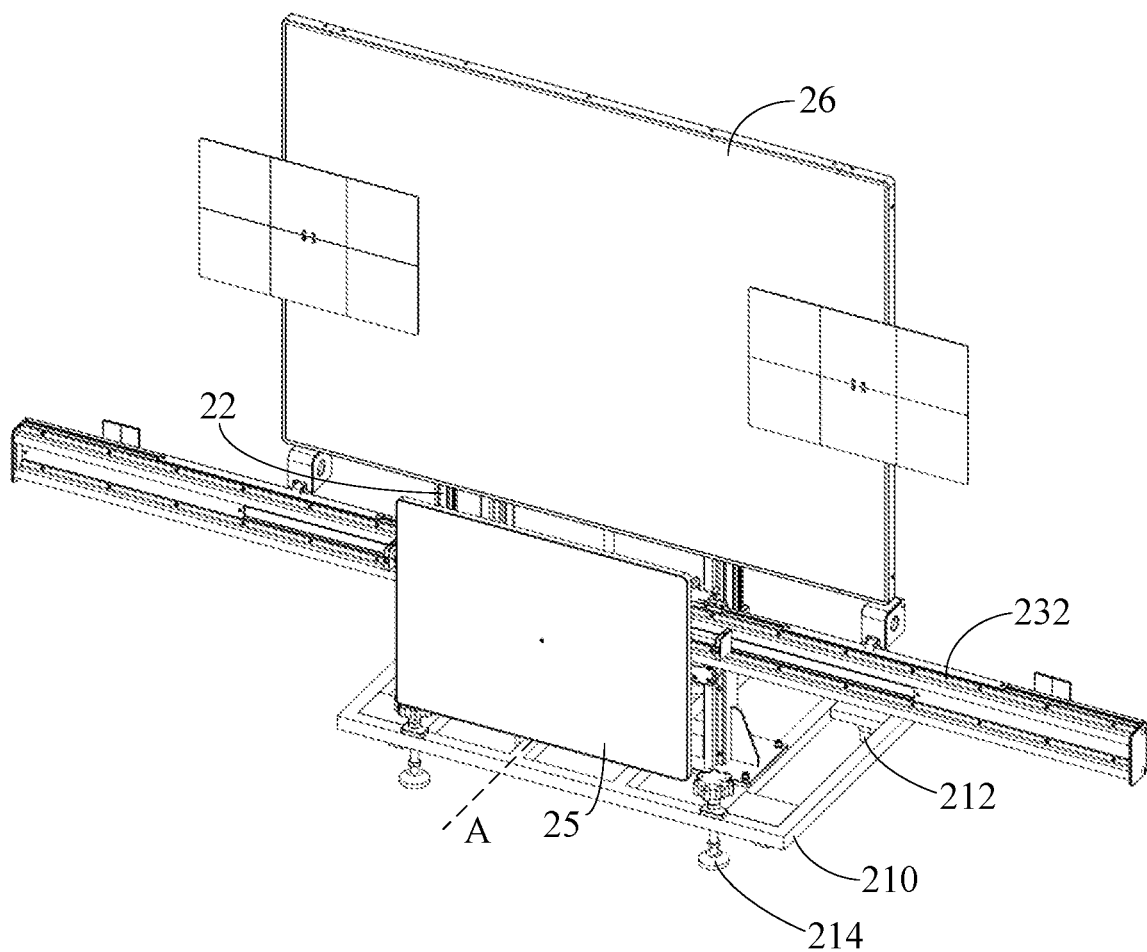
FIG. 5 is a schematic structural diagram of the calibration device as shown in FIG. 4, where the calibration device is mounted with a radar calibration board and a pattern board.
Figure 6:
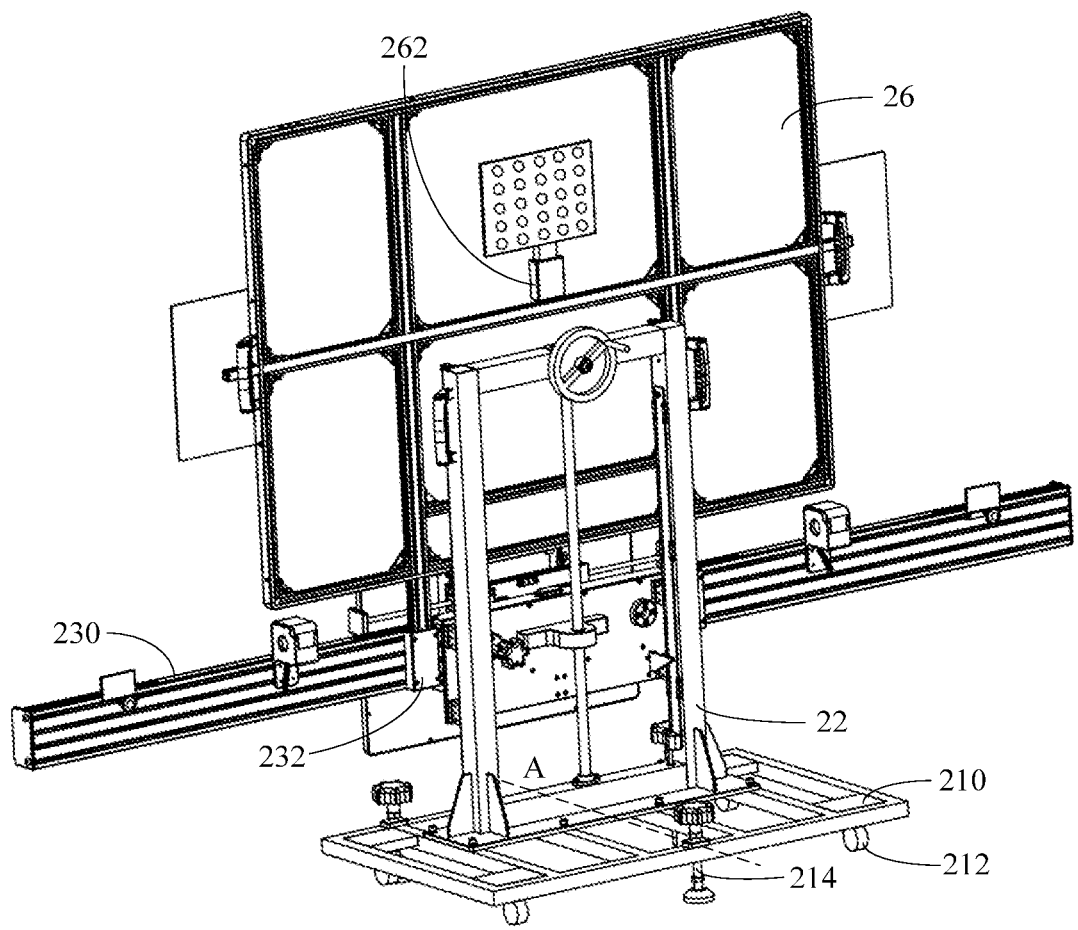
FIG. 6 is a schematic structural diagram of the calibration device as shown in FIG. 5 from another angle.

Referring to FIG. 5 and FIG. 6, a radar calibration board 25 is mounted at the sliding member 24, to calibrate a vehicle-mounted radar; a mounting post of a pattern board 26 is inserted into the mounting base 232 for calibrating a vehicle-mounted lane keeping system. A back surface of the pattern board 26 is provided with a fixed base 262 for mounting a target. A center line of the pattern board 26, a center line of the fixed base 262, a center line of a target surface of the target of the fixed base 262, and a longitudinal center line A of the calibration device 20 are located in a same vertical surface. Moving the bracket assembly 23 in a vertical direction with respect to the poling stent 22 may adjust a horizontal height of the target of the fixed base 262. As can be understood, in some other embodiments, a structure for mounting the target can be disposed at any position of the calibration device 20 according to actual requirements, as long as the target is departed from the vehicle 30 and faces the bracket 114. For example, a fixation device is disposed at the transverse support shaft 230 for mounting the target, and the target is departed from the vehicle 30 and faces the bracket 114.

As can be understood, the calibration device 20 in the embodiment of the present application may include a universal type bracket, a simple bracket, a special bracket, etc. For example, the calibration device is the universal type bracket, and can support the calibration component adapted to a plurality of vehicle types and models such as a radar calibration member and a pattern board. The simple bracket may facilitate movements and can support the calibration components for one or more systems or sensors in an assistance system. The special bracket is merely used for supporting the calibration components of special vehicle types and models.

In the embodiment of the present application, the definitions of the target and the target are consistent.

Referring to FIG. 1 again, in the scene, the calibration device 20 is placed between the wheel aligner 10 and the vehicle 30. Before calibration of vehicle-mounted equipment of the vehicle 30 such as a camera and a radar using the calibration component installed on the calibration device 20, it is required to use the wheel aligner 10 to locate the calibrate device 20 right in front of or right behind the vehicle 30, or other positions indicated in a calibration manual with respect to the vehicle.

In this case, four first targets 320 are respectively mounted on four tires 310 of the vehicle 30, and the first targets 320 may be understood as vehicle-mounted targets. In an implementation, each first target 320 has a reference point; four reference points of the four first targets 320 are respectively distant from a longitudinal center line O of the vehicle 30 by an equal distance; two reference points of two first targets 320 located at front wheels are symmetric with respect to the longitudinal center line O of the vehicle 30, and two reference points of two first targets 320 located at rear wheels are also symmetric with respect to the longitudinal center line O of the vehicle 30, so that the four reference points of the four first targets 320 are respectively located at four vertexes of a rectangle, and the central axis of the rectangle overlaps the longitudinal center line O of the vehicle 30. Certainly, in the embodiment of the present application, each first target 320 may further include a plurality of reference points, which are not limited herein.

A second target 220 is mounted on the calibration device 20, and the second target may be understood as a reference target.

One of the first image sensors 12 is used for photographing two first targets 320 at one side of the vehicle 30, the other one of the first image sensors 12 is used for photographing the other two first targets 320 located at the other side of the vehicle 30. The computer 14 is used for processing images photographed by the two first image sensors 12 and determining positions of the four targets 320, so as to obtain position information of the vehicle 30. Specifically, the position information of the vehicle 30 may include the positions of the reference points of the vehicle 30, for example, calculating the position of each wheel center; and furthermore, an overall position of the vehicle is determined according to the positions of the reference points, for example, the position of the central axis or thrust line in the vehicle; or the position information of the vehicle 30 may include the position of the central axis or thrust line in the vehicle; the position of the central axis or thrust line in the vehicle can be calculated directly based on the positions of the reference points on the first targets 320. The second image sensor 14 is used for photographing the second target 220; the computer 14 is used for processing an image obtained by photographing by the second image sensor 14 and determining the position of the second target 220, so as to obtain the position information of the calibration device 20. Specifically, the position information of the calibration device 20 may include the center position of the calibration device 20, the position of a certain shaft of the calibration device 20, etc., or position information for assisting in determining the position of the calibration component on the calibration device. The computer 15 is further used for determining, an adjusting mode of the calibration device 20 based on the position information of the vehicle 30 and the position information of the calibration device 20, so that the calibration device 20 is aligned with the vehicle 30 according to an anticipated position or direction.

In this embodiment, the position information of the vehicle 30 includes position information of the longitudinal center line O of the vehicle 30. The computer 15 images the four first targets 320 as vehicle-mounted targets; the computer 15 obtains the position of the central axis of the four reference points of the four first targets 320, and uses the position of the central axis of the four reference points as the position of the longitudinal center line O of the vehicle 30. In this embodiment, the longitudinal center line O of the vehicle 30 is located at a central axis surface of the vehicle 30 and is horizontally disposed. The central axis surface of the vehicle 30 is vertically disposed and the vehicle 30 is symmetrically disposed with respect to the central axis surface thereof.

In some embodiments, the position information of the vehicle 30 may further include position information of a point 300 in the middle of the two front tires 310 of the vehicle 30.

In this embodiment, the position information of the calibration device 20 includes the position information of the longitudinal center line of the calibration device 20. The second image sensor 14 images the second target 220 as a reference target; the second target 220 has a reference point; and the computer 15 calculates the position information of the longitudinal center line A of the calibration device 20 using the reference point of the second target 220. For example, a center point 2200 of the target surface of the second target 220 is used as the reference point and a straight line passing through the center point 2200 of the target surface of the second target 220 and perpendicular to the target surface of the second target 220 is used as the longitudinal center line A of the calibration device 20; the computer 15 adopts a SLAM algorithm to calculate the position of the longitudinal center line A of the calibration device 20 in a coordinate system according to the position of the target surface of the second target 220 in the coordinate system; for another example, any point of the target surface of the second target 220 is used as the reference point; the position of the straight line passing through the reference point and perpendicular to the target surface of the second target 220 is calculated; the relative positions of the straight line passing through the reference point and perpendicular to the target surface of the second target 220 and the longitudinal center line A of the calibration device 20 are preset; the computer 15 adopts the SLAM algorithm to calculate the position of the longitudinal center line A of the calibration device 20 in the coordinate system according to the position of the straight line passing through the reference point and perpendicular to the target surface of the second target 220.

The longitudinal center line A of the calibration device 20 is located at a central axis surface of the calibration device 20 and is horizontally disposed.

In this embodiment, the transverse distance between the longitudinal center line A and the longitudinal center line O is zero, i.e., when the longitudinal center line A overlaps the longitudinal center line O, the calibration requirement is met, and the calibration device 20 is aligned with the vehicle 30.

Furthermore, in some embodiments, while requiring to overlap the longitudinal center line A of the calibration device 20 with the longitudinal center line O of the vehicle, it further requires to correct a vertical surface of the calibration device 20, i.e., adjusting an intersection line between the vertical surface of the calibration device 20 and the central axis surface of the vehicle 30 to be perpendicular to the ground, so that the requirements of position adjustment of the calibration device 20 can be achieved. The vertical surface of the calibration device 20 refers to a surface of the calibration device 20 facing the vehicle and approximately perpendicular to the ground. Specifically, an angle of the intersection line between the vertical surface of the calibration device 20 and the central axis surface of the vehicle 30 with respect to the ground can be calculated based on the reference point on the second target 220, or an angle of the vertical surface of the calibration device 20 with respect to the ground is calculated based on the reference point on the second target 220, and the position of the central axis surface of the vehicle 30 is calculated based on the reference point on the first target 320, so as to calculate, based on an angle of the vertical surface of the calibration device 20 with respect to the ground and the position of the central axis surface of the vehicle, an angle of the intersection line between the vertical surface of the calibration device 20 and the central axis surface of the vehicle 30 with respect to the ground, and guide the operator to adjust the calibration device 20, so that the intersection line between the vertical surface of the calibration device 20 and the central axis surface of the vehicle 30 is perpendicular to the ground.

After the calibration device 20 is aligned with the vehicle 30, the calibration device 20 can install, according to actual requirements, the calibration component, such as a radar calibration component, a pattern board, and a reflection mirror, to calibrate the driver assistance system of the vehicle 30.

In this embodiment, the computer 15 is installed with graphics processing software, for example, SLAM software, which can simulate a three-dimensional image of the calibration device 20 and the vehicle 30 and display same in the display 150. According to a first calibration target image and a second calibration target image, the computer 15 controls the display 150 to display the longitudinal center line A of the calibration device 20 and the longitudinal center line O of the vehicle 30 in the three-dimensional image of the calibration device 20 and the vehicle 30. Meanwhile, the display 150 displays a deviation value of the longitudinal center line O of the vehicle 30 and the longitudinal center line A of the calibration device 20 in the three-dimensional image of the calibration device 20 and the vehicle 30. To facilitate guiding the operator to align the calibration device 20 with the vehicle 30, the computer 15 may display, in the three-dimensional image, an error signal indicating a direction and deviation size. The operator may move the calibration device 20 with respect to the vehicle 30 according to the indication direction to reduce or eliminate the deviation between the vehicle 30 and the calibration device 20. In the process of moving the calibration device 20 with respect to the vehicle 30, the first image sensors 12 and the second image sensor 14 continuously photograph new images, and the computer 15 repeatedly processes and analyzes the updated images and indicates again whether the indication direction is expected or wrong. According to requirements, the calibration device 20 is repeatedly moved until the computer 15 calculates that the deviation between the vehicle 30 and the calibration device 20 is eliminated.

Figure 7:
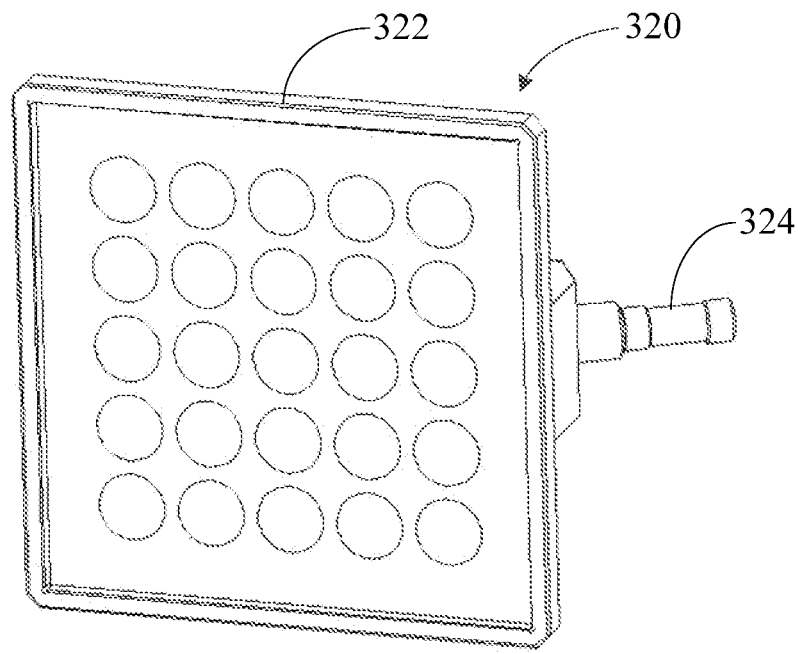
FIG. 7 is a schematic structural diagram of a first target provided by an embodiment of the present disclosure.

Referring to FIG. 7, each first target 320 includes a first target body 322 and a mounting post 324; the first target body 322 is mounted at one end of the mounting post 324; the first target body 322 has a target surface; the target surface has a pattern for facilitating determining the position of a target surface of the first target body 322 in a coordinate when the computer 15 processes pattern information of the target surface of the first target body 322; the center point of the pattern may be used as the reference point of the first target 320. The mounting post 324 is used for mounting the tire 310.

Figure 8:
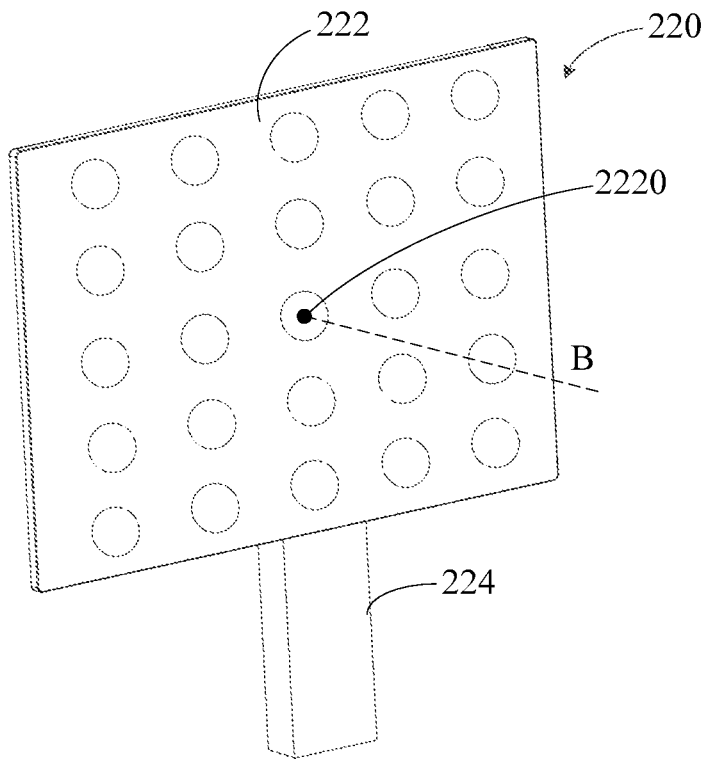
FIG. 8 is a schematic structural diagram of a second target provided by an embodiment of the present disclosure.

Referring to FIG. 8, the second target 220 includes a second target body 222 and a connection post 224; the second target body 222 is mounted at one end of the connection post 224; the second target body 222 has a target surface; the target surface has a center point 2220; the target surface is provided with a pattern for facilitating to determine the position of a target surface of the second target body 222 in a coordinate when the computer 15 processes pattern information of the target surface of the second target body 222; the center point of the pattern is located at the center of the target surface and may be used as the reference point of the second target 220. The connection post 224 is used for mounting the calibration device 20. Specifically, the connection post 224 is inserted into the fixed base 262; a center line B of the target surface of the second target 222 and the longitudinal center line A of the calibration device 20 are located in a same vertical surface (referring to FIG. 6), so that the center point 2200 of the target surface of the second target 220 is located at the central axis surface of the calibration device 20.

As can be understood, in some embodiments, the second image sensor 14 may be omitted, and at least one of the two first image sensors 12 may slide along the bracket 114. After the two first image sensors 12 finish photographing the four first targets 320, the first image sensors 12 that can slide along the bracket 114 slide to the middle of the bracket 114, to photograph the second target 220; or the second image sensor 14 may be omitted, and the two first image sensors 12 are fixedly mounted at two ends of the bracket 114; after the two first image sensors 12 finish photographing the four first targets 320, at least one of the two first image sensors 12 uses the two-axial gimbal or triaxial gimbal to adjust the photographing angle, to photograph the second target 220.

Figure 9:
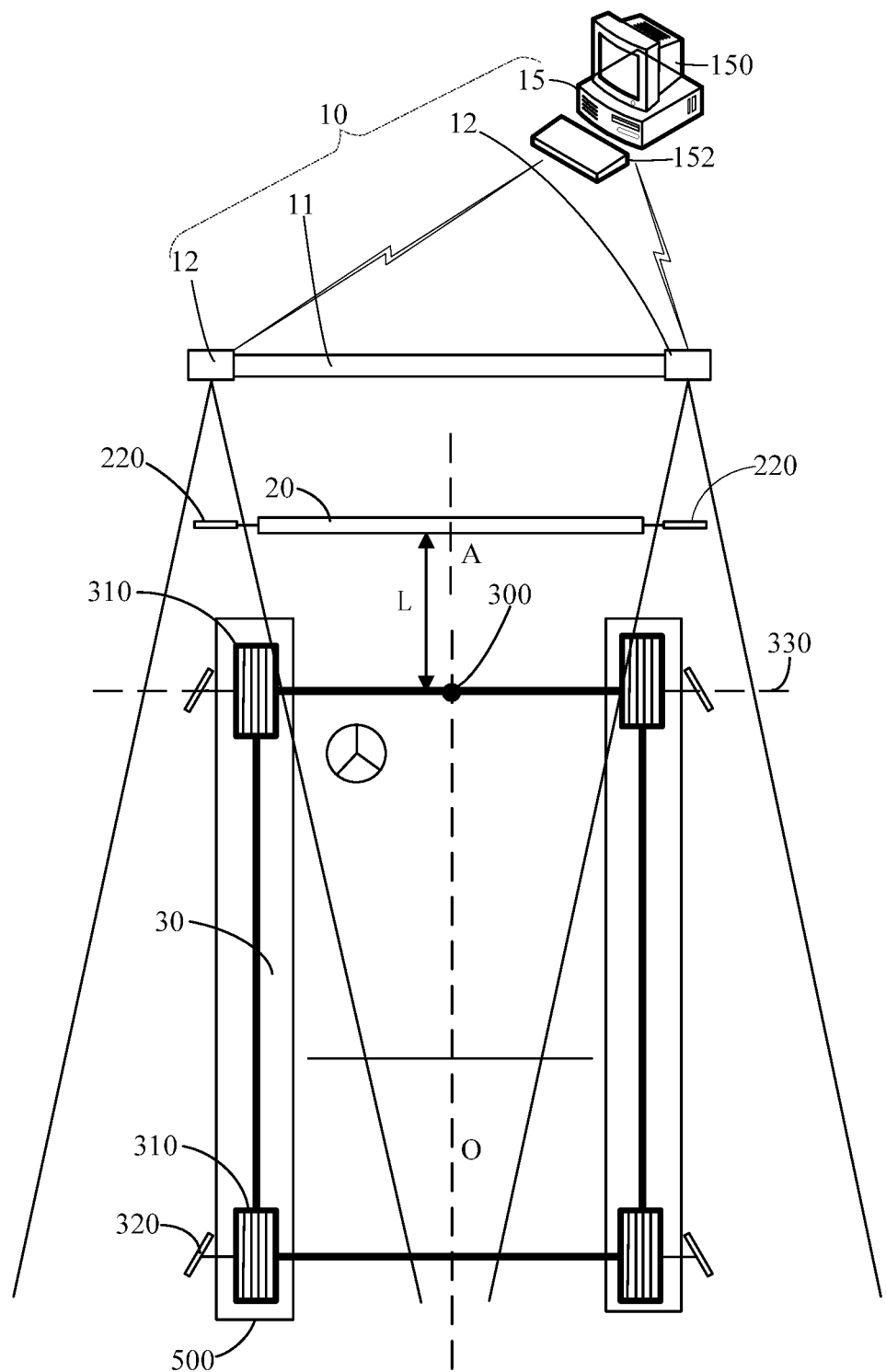
FIG. 9 is a scene diagram of a method for aligning a calibration device with a vehicle based on a wheel aligner shown in some embodiments of the present disclosure.

As can be understood, in some embodiments, referring to FIG. 9, the second image sensor 14 may be omitted, and the two first image sensors 12 are fixedly mounted at two ends of the bracket 114.

Figure 10:
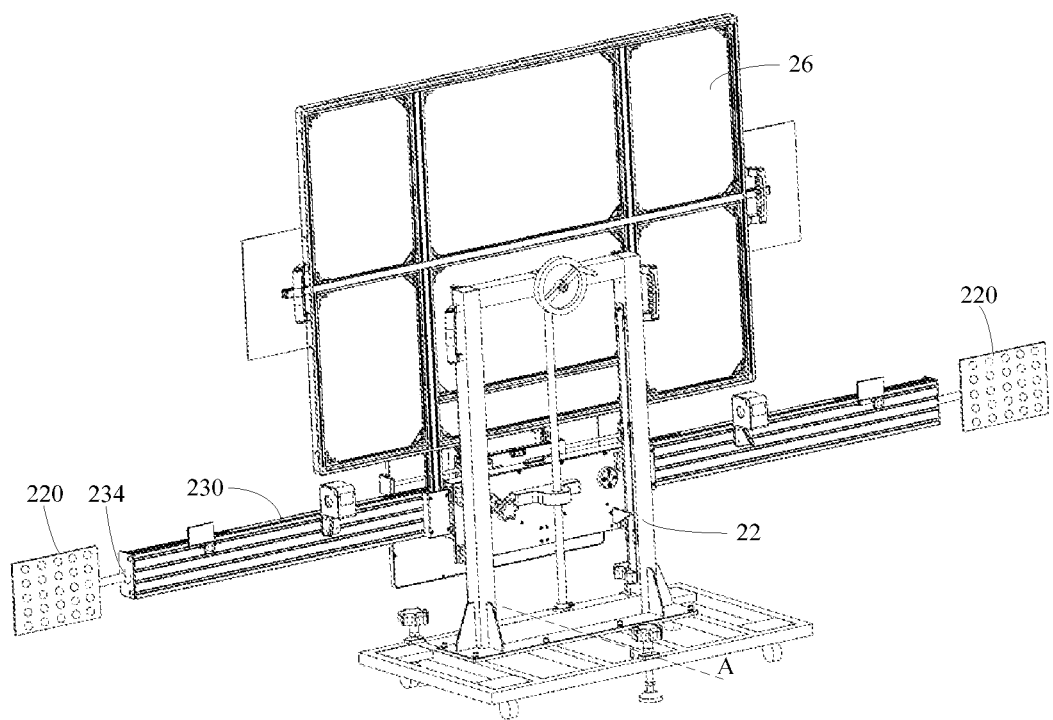
FIG. 10 is a schematic structural diagram of the calibration device in the scene diagram shown in FIG. 9.

Referring to FIG. 10, two ends of the transverse support shaft 230 are separately provided with a fixation device 234; the fixation device 234 is mounted with the second target 220; the two second targets 220 are respectively located at two ends of the transverse support shaft 230; the position of the longitudinal center line A of the calibration device 20 can be determined according to the preset position relation between the two second targets 220 and the longitudinal center line A of the calibration device 20; for example, by presetting a connection line of two reference points of the two second targets 220 to be perpendicular to the longitudinal center line A of the calibration device 20 and the two reference points of the two second targets 220 to respectively have an equal distance from the geometric center point of the transverse support shaft 230, the computer 15 can obtain the position of the longitudinal center line A of the calibration device 20 according to the preset position relation between the two reference points of the second targets 220 and the longitudinal center line A of the calibration device 20. The geometric center point of the transverse support shaft 230 and the longitudinal center line A of the calibration device 20 are located at the same vertical surface.

When the wheel aligner 10 is used for aligning the calibration device 20 with the vehicle 30, one of the first image sensors 12 is used for photographing two first targets 320 and one second target 220 located at one side of the vehicle 30, the other one of the first image sensors 12 is used for photographing the other two first targets 320 and the other second target 220 located at the other side of the vehicle 30.

The computer 14 is used for processing the image photographed by the two first image sensors 12, and determining the positions of the four first targets 320 and the positions of the two second targets 220; and the computer 14 obtains the position information of the vehicle 30 based on the positions of the four first targets 320 and obtains the position information of the calibration device 20 based on the positions of the two second targets 220. The computer 14 is further used for determining the adjusting mode of the calibration device 20 based on the position information of the vehicle 30 and the position information of the calibration device 20, so that the calibration device 20 is aligned with the vehicle 30 according to an anticipated position or direction; or in some alternative embodiments, one of the first image sensors 12 is used for photographing the two first targets 320 located at one side of the vehicle 30, the other one of the first image sensors 12 is used for photographing the other two first targets 320 located at the other side of the vehicle 30. The computer 14 is used for processing images photographed by the two first image sensors 12 and determining positions of the four targets 320, so as to obtain position information of the vehicle 30. The two first image sensors 12 further respectively photograph the two second targets 220; the computer 14 is used for processing images of the second targets 220 and determining the positions of the second targets 220, so as to obtain the position information of the calibration device 20.

Figure 11:
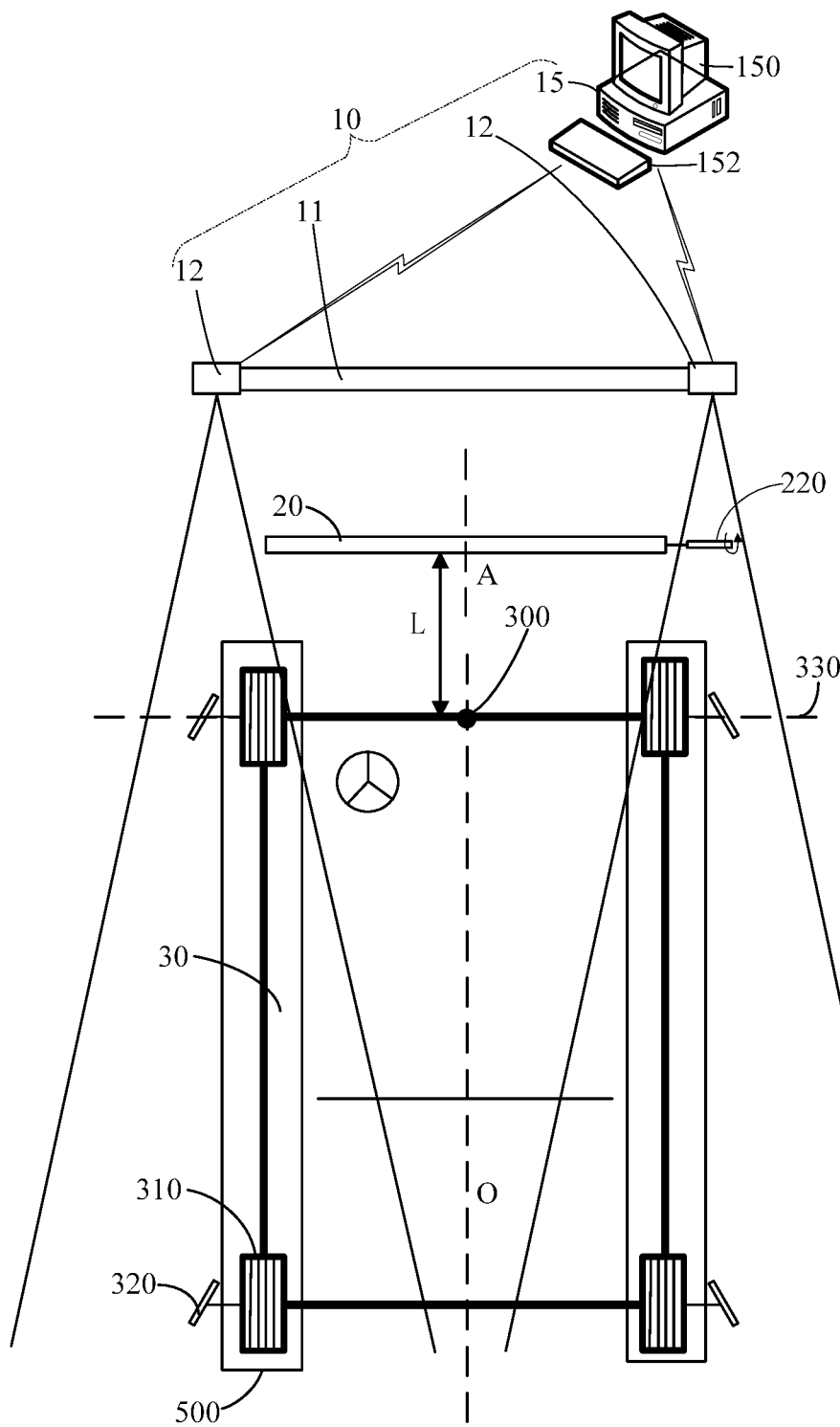
FIG. 11 is a scene diagram of a method for aligning a calibration device with a vehicle based on a wheel aligner shown in other embodiments of the present disclosure.
Figure 12:
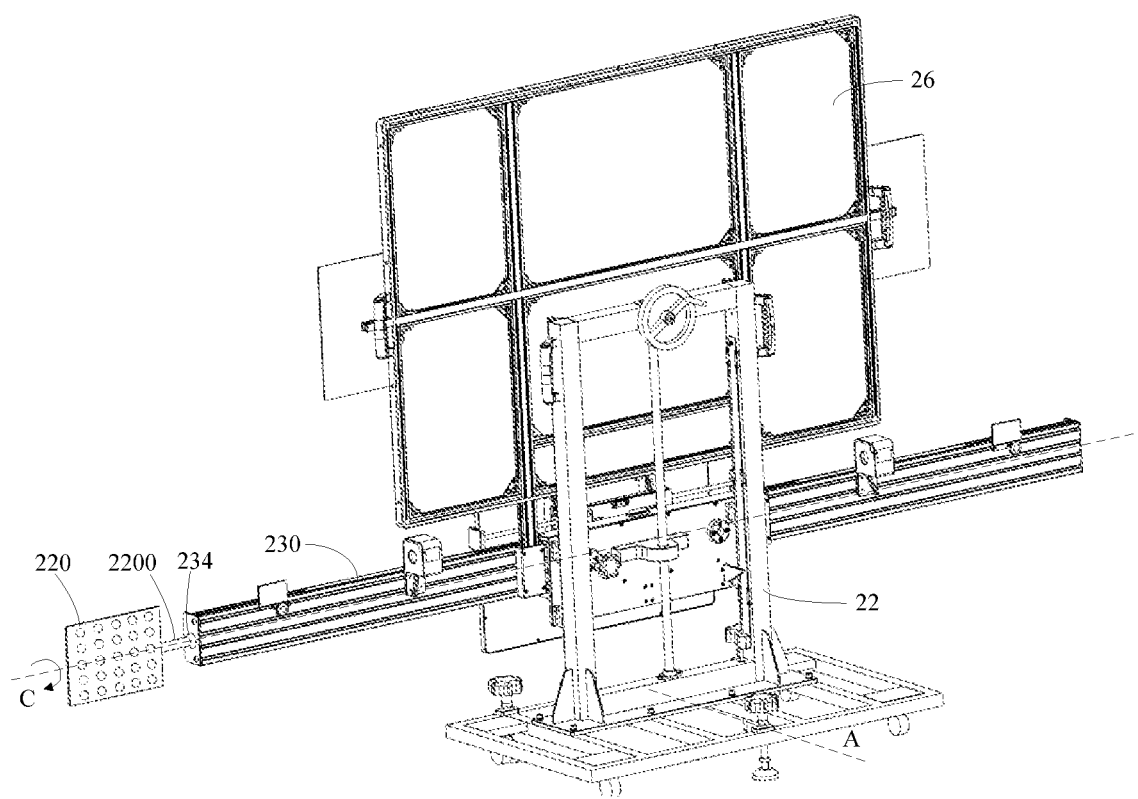
FIG. 12 is a schematic structural diagram of the calibration device in the scene diagram shown in FIG. 11.

Referring to FIG. 11 and FIG. 12, in some embodiments, one end of the transverse support shaft 230 is provided with a fixation device 234; the fixation device 234 is mounted with the second targets 220; the second targets 220 may rotate around a transverse axis C of the transverse support shaft 230, so that the second targets 220 are located at different position states. Specifically, the second target 220 includes a connection post 2200; the center axis of the connection post 2200 overlaps the transverse axis C; one end of the connection post 2200 is threadedly fit on the fixation device 234; and the connection post 2200 may rotate around the transverse axis C with respect to the fixation device 234 so as to drive the second target 220 to rotate around the transverse axis C. The operator may adjust the second target 220 so that the second target 220 rotates around the transverse axis C.

Along the direction parallel to the transverse axis C, the reference point of the second target 220 is separated from the geometric center point of the transverse support shaft 230 by a preset distance. The geometric center point of the transverse support shaft 230 and the longitudinal center line A of the calibration device 20 are located at the same vertical surface.

When the wheel aligner 10 is used for aligning the calibration device 20 with the vehicle 30, one of the first image sensors 12 is used for photographing two first targets 320 and the second target 220 located at one side of the vehicle 30; the second target 220 rotates around the transverse axis C to adjust to different position states; the first image sensors 12 further photograph the second target 220; the other one of the first image sensors 12 is used for photographing the other two first targets 320 at the other side of the vehicle 30.

The computer 14 is used for processing a first target image obtained by the two first image sensors 12 and determining the positions of the four first targets 320; and the computer 14 obtains the position information of the vehicle 30 according to the positions of the four first targets 320.

The computer 14 is used for determining the position of the second target 220 and the position of the transverse axis C based on second target images at different position states photographed by one of the first image sensors 12, and obtaining the position information of the calibration device 20 by combining the preset distance between the reference point of the second target 220 and the geometric center point of the transverse support shaft 230.

The computer 14 is further used for determining, an adjusting mode of the calibration device 20 based on the position information of the vehicle 30 and the position information of the calibration device 20, so that the calibration device 20 is aligned with the vehicle 30 according to an anticipated position or direction.

Alternatively, in some alternative embodiments, one of the first image sensors 12 is used for photographing the two first targets 320 located at one side of the vehicle 30, the other one of the first image sensors 12 is used for photographing the other two first targets 320 located at the other side of the vehicle 30. The computer 14 is used for processing images photographed by the two first image sensors 12 and determining positions of the four targets 320, so as to obtain position information of the vehicle 30. The first image sensors 12 located at one side of the second targets 220 further respectively photograph at least two second targets 220 at different position states; the computer 14 is used for processing the second target images at different position states, determining the positions of the second targets 220, and the position of the transverse axis C, and obtaining, by combining the preset distance between the reference point of the second target 220 and the geometric center point of the transverse support shaft 230, the position information of the calibration device 20.

In this embodiment, the position of the geometric center point of the transverse support shaft 230 can be determined based on the preset distance between the reference point of the second target 220 and the geometric center point of the transverse support shaft 230. Using a straight line passing through the geometric center point and perpendicular to the transverse axis C as the longitudinal center line A of the calibration device 20 may obtain the position of the longitudinal center line A of the calibration device 20.

As can be understood, in some other embodiments, the second target 220 may be disposed at any position of the calibration device 20 as long as the second target 220 may rotate around a rotation axis, so that the second target 220 can be adjusted to a different position state; the image sensor images the second target 220; the computer 15 can determine the position of the reference point of the second target 220 and the position of the rotation shaft based on the second target images of different states; the relative positions of the rotation shaft and the transverse axis C may be preset; the computer 15 calculates the position of the transverse axis C according to the preset relative position between the rotation shaft and the transverse axis C.

In this embodiment, the terms "first" and "second" are merely for the purpose of description; when the image sensor is used for imaging the first target 320, the image sensor is used as a "first image sensor"; when the image sensor is used for imaging the second target 220, the image sensor is used as a "second image sensor"; for example, in the scene shown in FIG. 9, the image sensors 12 are used as the first image sensor and the second image sensor at the same time for imaging the first target 320 and the second target 220; for another example, in the scene shown in FIG. 11, one of the image sensors 12 is first used as the first image sensor for imaging the first target 320 and is then used as the second image sensor for imaging the second target 220.

As can be understood, in some embodiments, the number of the image sensors can be changed according to actual requirements, as long as it is at least one, for example, one image sensor is mounted at the bracket 114; and the image sensor may slide along the bracket 114 to different preset photographing points; when sliding to one side of the vehicle 30, the image sensor may image the two first targets 320 or the second target 220 located at one side of the vehicle 30; when sliding to the middle of the bracket 114, the image sensor may image the second target 220; when sliding to the other side of the vehicle 30, the image sensor may image the other two first targets 320 or the second target 220 located at the other side of the vehicle 30.

Figure 13:
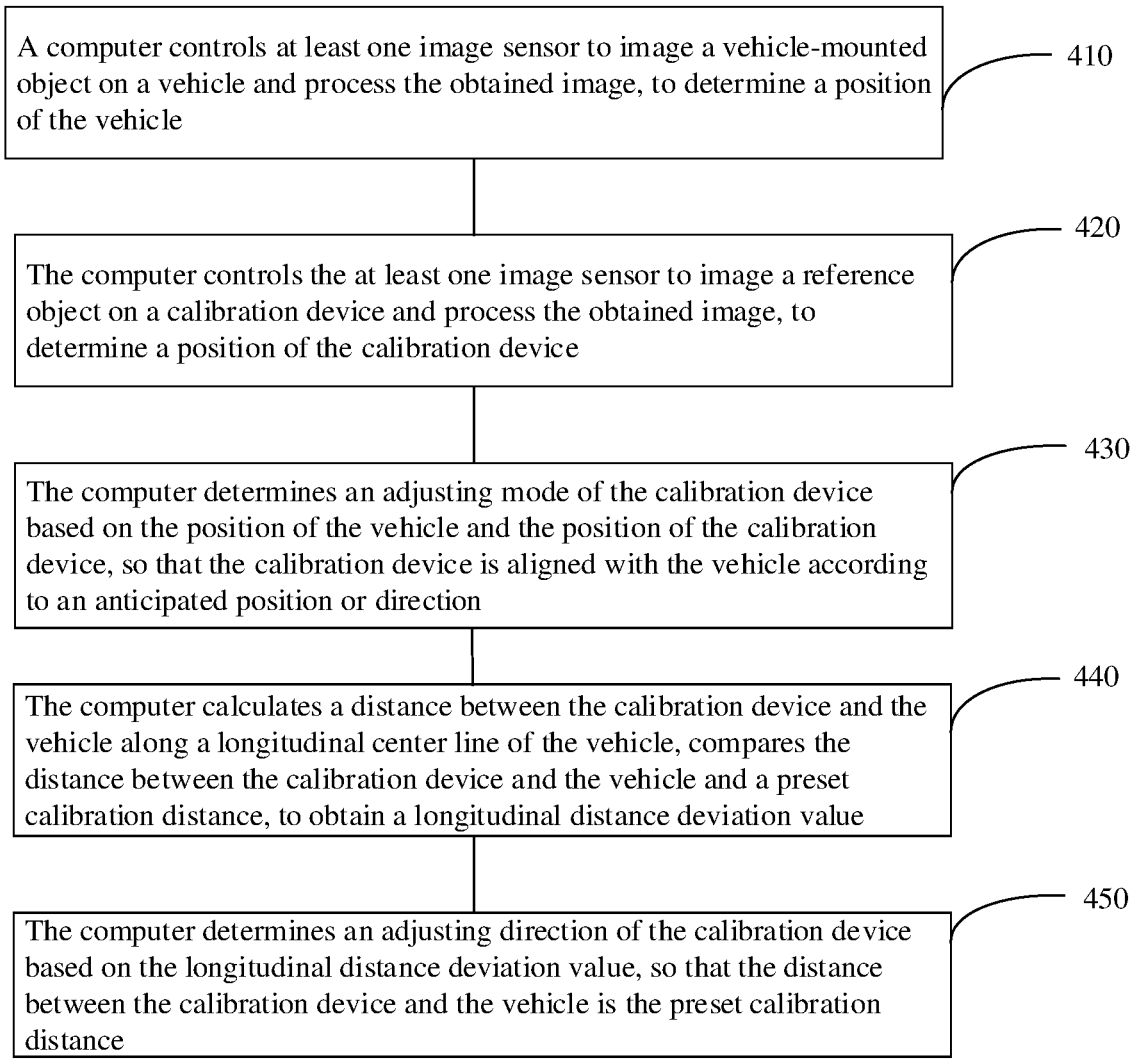
FIG. 13 is a flow chart of a method for aligning a calibration device with a vehicle based on a wheel aligner provided by an embodiment of the present disclosure.

FIG. 13 is a flow chart of a method for aligning a calibration device with a vehicle based on a wheel aligner provided by an embodiment of the present disclosure. The scene of the method is as shown in FIG. 1, FIG. 9, and FIG. 11. The method is described below by combining FIG. 1, FIG. 9, FIG. 11, and FIG. 13. The method includes:

Step 410: A computer controls at least one image sensor to image a vehicle-mounted target on a vehicle and process the obtained image, to determine a position of the vehicle.

In the scene shown in FIG. 1, FIG. 9, or FIG. 11, when the calibration device 20 is required to be aligned with the vehicle 30, the vehicle 30 is driven into a track platform 500. The track platform 500 may use a track platform in the prior art for adjusting a horizontal height of the vehicle 30, and at the same time, four tires 310 of the vehicle 30 are located at a same horizontal plane. A first target 320 is mounted on each of the tires 310. Specifically, the mounting post 324 is mounted on a hub fixture of the tire 310; the positions of the four first targets 320 are adjusted, so that four reference points of the four first targets 320 are respectively distant from a longitudinal center line O of the vehicle 30 by an equal distance; two reference points of two first targets 320 located at front wheels are symmetric with respect to the longitudinal center line O of the vehicle 30, and two reference points of two first targets 320 located at rear wheels are also symmetric with respect to the longitudinal center line O of the vehicle 30, so that the four reference points of the four first targets 320 are respectively located at four vertexes of a rectangle, and the central axis of the rectangle overlaps the longitudinal center line O of the vehicle 30.

The wheel aligner 10 and the calibration device 20 are moved right in front of (or right behind) the vehicle 30; the calibration device 20 is located between the wheel aligner 10 and the vehicle 30; both the wheel aligner 10 and the calibration device 20 are generally located at the center in front of the vehicle 30 and are approximately perpendicular to a front part of the vehicle 30. The target surface of the first target body 322 faces the four-wheel aligner 10.

The target surface of the second target 220 faces away from the vehicle 30 and faces the wheel aligner 10.

The wheel aligner 10 and the calibration device 20 are separated by a preset distance, for example, separated by 1.5 m. The bracket 114 is horizontally disposed. The computer 15 adjusts the angle of the first image sensor 12 located at one side of the vehicle 30, so that the first image sensor 12 is aligned with the target surfaces of two first targets 320 located at one side of the vehicle 30; similarly, the computer 15 adjusts the angle of the other first image sensor 12 located at the other side of the vehicle 30, so that the first image sensor 12 is aligned with the target surfaces of the two first targets 320 located at the other side of the vehicle 30. The operator adjusts the height of the wheel aligner 10, so that the two first image sensors 12 and the first targets 320 are generally located at the same horizontal plane.

The two first image sensors 12 are started; the computer 15 is used for controlling the two first image sensors 12 to respectively photograph the target surfaces of the four first targets 320, and respectively obtaining a first image and a second image.

In this embodiment, the first targets 320 are used as the vehicle-mounted targets, to facilitate the computer 15 to accurately and rapidly determine the position of the first target 320 based on the first target image. As can be understood, in some other embodiments, other vehicle-mounted targets for assisting in positioning can also be used.

The computer 15 processes the first image and the second image; for example, the computer 15 uses the SLAM algorithm, to determine the positions of the four reference points of the four first targets 320 in a coordinate system based on the first image and the second image. An origin point of the coordinate system may be at any position, for example, the position where either one of the two first image sensors 12 is located or the position where the second image sensor 14 is located is used as the origin point of the coordinate system; in the scene shown in FIG. 1, the computer 15 uses the position of the second image sensor 14 in the coordinate system as the origin point of the coordinate system.

The computer 15 determines, based on the image of the vehicle-mounted target, the position of the vehicle-mounted target relative to the first image sensor 12; the computer 15 determines, based on the position of the vehicle-mounted target relative to the first image sensor 12, the position of the vehicle 30 relative to the first image sensor 12; the computer 15 determines, based on the position of the vehicle 30 relative to the first image sensor 12 and the position of the first image sensor 12 relative to the second image sensor 14, the position of the vehicle 30 relative to the second image sensor 14.

Specifically, the position information of the vehicle 30 includes the position information of the longitudinal center line O of the vehicle 30. The computer 15 uses the four first targets 320 as vehicle-mounted targets for imaging; each first target 320 has a reference point; the computer 15 determines, based on the images of the vehicle-mounted targets, the positions of the reference points relative to the first image sensors 12; the computer 15 obtains the position of the longitudinal center line of the four reference points of the four first targets 320 relative to the first image sensors 12, and uses the position of the longitudinal center line of the four reference points relative to the first image sensors 12 as the position of the longitudinal center line O of the vehicle 30 relative to the first image sensors 12. When using the position of the second image sensor 14 in the coordinate system as the origin point of the coordinate system, the computer 15 determines, based on the position of the longitudinal center line O of the vehicle 30 relative t to the first image sensors 12 and the positions of the first image sensors 12 relative to the second image sensor 14, the position of the longitudinal center line O of the vehicle 30 relative to the second image sensor 14.

In this embodiment, the longitudinal center line O of the vehicle 30 is located at a central axis surface of the vehicle 30 and is horizontally disposed. The central axis surface of the vehicle 30 is vertically disposed and the vehicle 30 is symmetrically disposed with respect to the central axis surface thereof.

The position information of the vehicle 30 may further include position information of a point 300 in the middle of the two front tires 310 of the vehicle 30. The computer 15 can calculate the position of the point 300 according to the positions of the four reference points of the four first targets 320 in the coordinate system.

As can be understood, in some embodiments, one image sensor is mounted at the bracket 114, and the image sensor may slide along the bracket 114 to different preset photographing points; when sliding to a preset photographing point at one side of the vehicle 30, the image sensor images two first targets 320 located at one side of the vehicle 30 to obtain the first image information; when sliding to a preset photographing point at the other side of the vehicle 30, the image sensor images the other two first targets 320 located at the other side of the vehicle 30 to obtain the second image information.

Step 420: The computer controls at least one image sensor to image a reference target on a calibration device and process the obtained image, to determine a position of the calibration device.

In the scene shown in FIG. 1, the second target 220 is mounted on the calibration device 20. The target surface of the second target 220 faces away from the vehicle 30, faces the four-wheel aligner 10, and is vertically disposed, and the center point 2200 of the target surface of the second target 220 is located at a central axis surface of the calibration device 20. The central axis surface of the calibration device 20 is vertically disposed and the calibration device 20 is symmetrically disposed with respect to the central axis surface thereof. In this embodiment, the second target 220 is used as a reference target.

The second image sensor 14 is located at the middle position between the two first image sensors 12; and the second image sensor 14 is separately away from the two first image sensors 12 by an equal distance. The computer 15 adjusts the angle of the second image sensor 14 so that the second image sensor 14 is aligned with the target surface of the second target 220. The operator adjusts the calibration device 20, so that the second image sensor 14 and the second target 220 are generally located at the same horizontal plane.

The computer 15 determines the position of the reference point in the image of the reference target relative to the second image sensor 14. The computer 15 further determines the position of the center of the calibration device 20 relative to the second image sensor 14, according to the position correspondence between the position of the reference point in the image of the reference target relative to the second image sensor 14 and the position of the center of the calibration device 20.

Specifically, the second image sensor 14 is started; the computer 15 is used for controlling the second image sensor 14 to photograph the target surface of the second target 220, so as to obtain third image information.

The computer 15 processes the third image information and determines, based on the third image information, the position of a reference point in the target surface of the second target 220 relative to the second image sensor 14.

The position information of the calibration device 20 includes the position information of the longitudinal center line of the calibration device 20. The second image sensor 14 uses the second target 220 as a reference target for imaging; the second target 220 has a reference point; the computer 15 calculates the position information of the longitudinal center line A of the calibration device 20 by using the reference point of the second target 220. For example, a center point 2200 of the target surface of the second target 220 is used as the reference point and a straight line passing through the center point 2200 of the target surface of the second target 220 and perpendicular to the target surface of the second target 220 is used as the longitudinal center line A of the calibration device 20; the computer 15 adopts a SLAM algorithm to calculate, based on the position of the reference point of the target surface of the second target 220 relative to the second image sensor 14, the position of the longitudinal center line A of the calibration device 20 relative to the second image sensor 14 (i.e., using the position of the second image sensor 14 as the position of the origin point in the coordinate system). For another example, the position of the straight line passing through the reference point and perpendicular to the target surface of the second target 220 is calculated by using any point of the target surface of the second target 220 as the reference point; the relative positions of the straight line passing through the reference point and perpendicular to the target surface of the second target 220 and the longitudinal center line A of the calibration device 20 are preset; the computer 15 adopts the SLAM algorithm to calculate the position of the longitudinal center line A of the calibration device 20 in the coordinate system based on the position of the straight line passing through the reference point and perpendicular to the target surface of the second target 220.

The longitudinal center line A of the calibration device 20 is located at a central axis surface of the calibration device 20 and is horizontally disposed.

In this embodiment, the second image sensor 14 is located at the middle position between the first image sensors 12 and the second image sensor 13, and the second image sensor 14 is separately away from the two first image sensors 12 by an equal distance; the distance between either of the two first image sensors 12 and the second image sensor 14 can be respectively obtained in advance through manual measurement; and when the computer 15 controls the second image sensor 14 to photograph and construct the coordinate system, the computer 15 determines, based on the distance between the first image sensors 12 and the second image sensor 14 obtained in advance, the positions of the two first image sensors 12 in the coordinate system. Both the wheel aligner 10 and the calibration device 20 are generally located at the center in front of the vehicle 30 and are generally perpendicular to a front part of the vehicle 30. The two first image sensors 12 are generally symmetrical with respect to the longitudinal center line O of the vehicle 30; the first image information of the first targets 320 mounted on the four tires 310 photographed by the two first image sensors 12 is similar to the second image information; and the computer 15 may process the first image information and the second image information more rapidly to reduce a data processing amount.

As can be understood, in some other implementations, the second image sensor 14 may be located at any position between the two first image sensors 12; and when the computer 15 controls the second image sensor 14 to photograph and construct the coordinate system, the computer 15 determines the positions of the two first image sensors 12 in the coordinate system based on the respective distance obtained in advance between the two first image sensors 12 and the second image sensor 14. The computer 15 may calculate the positions of the four reference points of the four first targets 320 in the coordinate system based on the first image information and the second image information of the four first targets 320 respectively photographed by the first image sensor 12.

The center point 2200 of the target surface of the second target 220 is located at the central axis surface of the calibration device 20; the computer 15 may use the center point 2200 of the target surface of the second target 220 as the reference point, use the straight line passing through the center point 2200 of the target surface of the second target 220 and perpendicular to the target surface of the second target 220 as the longitudinal center line A of the calibration device 20, and directly calculate the position of the longitudinal center line A of the calibration device 20 in the coordinate system based on the position of the target surface of the second target 220 in the coordinate system, so as to reduce the data processing amount. As can be understood that, in some other embodiments, the center point 2200 of the target surface of the second target 220 is not limited to being located at the central axis surface of the calibration device 20 and can be disposed at any position of the calibration device 20 according to actual conditions; the distance between the center point 2200 of the target surface of the second target 220 and the central axis surface of the calibration device 20 can be obtained in advance through manual measurement; the computer 15 determines the position of the longitudinal center line A of the calibration device 20 in the coordinate system based on the distance between the center point 2200 and the central axis surface of the calibration device 20 obtained in advance and the position of the center point 2200 of the target surface of the second target 220 in the coordinate system.

In the scene shown in FIG. 9, the computer 15 controls one of the first image sensors 12 to photograph the two first targets 320 and the second target 220 located at one side of the vehicle 30, and controls the other one of the first image sensors 12 to photograph the other two first targets 320 and the other second target 220 located at the other side of the vehicle 30. The computer 14 processes images photographed by the two first image sensors 12 and determines the positions of the two second targets 220. Alternatively, in some alternative embodiments, the computer 15 controls the two first image sensors 12 to respectively and individually image the two second targets 220.

The computer 15 determines the position of the longitudinal center line A of the calibration device 20 based on the preset position relation between the two second targets 220 and the longitudinal center line A of the calibration device 20; for example, by presetting a connection line of two reference points of the two second targets 220 to be perpendicular to the longitudinal center line A of the calibration device 20 and the two reference points of the two second targets 220 to respectively have an equal distance from the geometric center point of the transverse support shaft 230, the computer 15 can obtain the position of the longitudinal center line A of the calibration device 20 based on the preset position relation between the two reference points of the second targets 220 and the longitudinal center line A of the calibration device 20. The geometric center point of the transverse support shaft 230 and the longitudinal center line A of the calibration device 20 are located at the same vertical surface.

In the scene shown in FIG. 11, the first image sensors 12 located at one side of the second targets 220 image the second targets 220 at different position states and obtain the second target images at different position states; the computer 14 determines the positions of the second targets 220 and the position of the transverse axis C based on the second target images at different position states, and obtains the position information of the calibration device 20 by combining the preset distance between the reference points of the second targets 220 and the geometric center point of the transverse support shaft 230. Specifically, according to the preset distance between the reference point of the second target 220 and the geometric center point of the transverse support shaft 230, the position of the geometric center point of the transverse support shaft 230 can be determined. By using a straight line passing through the geometric center point and perpendicular to the transverse axis C as the longitudinal center line A of the calibration device 20, the position of the longitudinal center line A of the calibration device 20 may be obtained.

As can be understood, in some embodiments, one image sensor is mounted at the bracket 114, and the image sensor may slide along the bracket 114 to different preset photographing points; and when the image sensor slides to one side of the second target 220, the computer 15 controls the image sensor to image the second targets 220 at different position states, to obtain second target images at different position states.

In this embodiment, the second target 220 is used as the reference target, to facilitate the computer 15 to accurately and rapidly determine the position of the second target 220 based on the second target image. As can be understood, in some other embodiments, other reference targets for assisting in positioning can also be used.

Step 430: The computer determines an adjusting mode of the calibration device based on the position of the vehicle and the position of the calibration device, so that the calibration device is aligned with the vehicle according to an anticipated position or direction.

The computer 15 compares the position of the longitudinal center line A of the calibration device 20 with the position of the longitudinal center line O of the vehicle 30 to obtain a deviation value. The deviation value includes a transverse distance and an included angle between the longitudinal center line A and the longitudinal center line O. The transverse distance and the included angle between the longitudinal center line A and the longitudinal center line O are both zero, i.e., when the longitudinal center line A and the longitudinal center line O overlap, the calibration requirements are achieved.

Furthermore, in some embodiments, while requiring to overlap the longitudinal center line A of the calibration device 20 with the longitudinal center line O of the vehicle, it further requires to correct a vertical surface of the calibration device 20, i.e., adjusting an intersection line between the vertical surface of the calibration device 20 and the central axis surface of the vehicle 30 to be perpendicular to the ground, so that the requirements of position adjustment of the calibration device 20 can be achieved. The vertical surface of the calibration device 20 refers to a surface of the calibration device 20 facing the vehicle and approximately perpendicular to the ground. Specifically, an angle of the intersection line between the vertical surface of the calibration device 20 and the central axis surface of the vehicle 30 relative to the ground can be calculated according to the reference point on the second target 220; or an angle of the vertical surface of the calibration device 20 relative to the ground is calculated based on the reference point on the second target 220, and the position of the central axis surface of the vehicle 30 is calculated based on the reference point on the first target 320. According to an angle of the vertical surface of the calibration device 20 with respect to the ground and the position of the central axis surface of the vehicle, the angle of the intersection line between the vertical surface of the calibration device 20 and the central axis surface of the vehicle 30 relative to the ground is calculated, so as to guide the operator to adjust the calibration device 20, so that the intersection line between the vertical surface of the calibration device 20 and the central axis surface of the vehicle 30 is perpendicular to the ground.

In this case, the calibration device 20 is aligned with the vehicle 30; the operator may install the calibration component on the calibration device 20, such as, a radar calibration component, a pattern board, and a reflection mirror, to calibrate the driver assistance system of the vehicle 30, such as a vehicle-mounted radar, a vehicle-mounted camera, and a vehicle-mounted lane keeping system.

To facilitate guiding the operator to align the calibration device 20 with the vehicle 30, the computer 15 includes a display 150; the computer 15 may control the display 150 to display the position derivation between the vehicle and the calibration device.

The computer 15 is installed with graphics processing software, for example, SLAM software, and can simulate a three-dimensional graph of the calibration device 20 and the vehicle 30, and display same in the display 150. According to a first target image and a second target image, the display 150 displays, in the three-dimensional image of the calibration device 20 and the vehicle 30, the longitudinal center line A of the calibration device 20 and the longitudinal center line O of the vehicle 30. Meanwhile, the display 150 displays, in the three-dimensional image of the calibration device 20 and the vehicle 30, a deviation value of the longitudinal center line A of the calibration device 20 and the longitudinal center line O of the vehicle 30.

To facilitate guiding the operator to align the calibration device 20 with the vehicle 30, the computer 15 may display, in the three-dimensional image, an error signal indicating a direction and deviation size. The operator may move the calibration device 20 with respect to the vehicle 30 according to the indication direction to eliminate the deviation between the vehicle 30 and the calibration device 20. In the process of moving the calibration device 20 with respect to the vehicle 30, the first image sensors 12 and the second image sensor 14 continuously photograph new images, and the computer 15 repeatedly processes and analyzes the updated images and indicates again whether the indication direction is expected or wrong. According to requirements, the calibration device 20 is repeatedly moved until the computer 15 calculates that the deviation between the vehicle 30 and the calibration device 20 is eliminated.

Furthermore, in some embodiments, the display 150 displays, in the three-dimensional image of the calibration device 20 and the vehicle 30, the vertical surface of the calibration device 20, the central axis surface of the vehicle 30, and the intersection line of the vertical surface of the calibration device 20 and the central axis surface of the vehicle 30. To facilitate the operator to adjust the intersection line of the vertical surface of the calibration device 20 and the central axis surface of the vehicle 30 to be perpendicular to the ground, the computer 15 may display, in the three-dimensional image, the angle value and indication direction of the intersection line and the ground; and the operator may adjust, according to the angle value and the indication direction, an pitch angle of the calibration device 20 until the intersection line is perpendicular to the ground.

After the calibration device 20 is aligned with the vehicle 30, the longitudinal center line O of the vehicle 30 and the longitudinal center line A of the calibration device 20 overlap; in some conditions, it is further required to calibrate the distance between the calibration device 20 and the vehicle 30, for example, the calibration device 20 is a radar calibration device; the radar calibration device requires to calibrate the vehicle-mounted radar of the vehicle 30 only by separating same from the vehicle 30 by a preset calibration distance. Hence, in some other embodiments, the method further includes:

Step 440: The computer calculates a distance between the calibration device and the vehicle along a longitudinal center line of the vehicle, compares the distance between the calibration device and the vehicle and a preset calibration distance, and obtains a longitudinal distance deviation value.

Step 450: The computer determines the adjusting direction of the calibration device based on the longitudinal distance deviation value, so that the distance between the calibration device and the vehicle is the preset calibration distance.

In the scene shown in FIG. 1, a distance L between the point 300 located between the two front wheels 310 and the center point 2200 of the target surface of the second target 220 may be used as the distance between the calibration device 20 and the vehicle 30 along the longitudinal center line O of the vehicle 30. The computer 15 can calculate the position of the point 300 based on the positions of the four reference points of the four first targets 320 in the coordinate system, and can calculate the distance L between the point 300 and the center point 2200 of the target surface of the second target 220 based on the position of the point 300 and the position of the center point 2200 of the target surface of the second target 220. The preset calibration distance between the calibration device 20 and the vehicle 30 can be determined according to the standard specification provided by a calibration device manufacturer. The computer 15 compares the preset calibration distance and the distance between the calibration device 20 and the vehicle 30, to obtain the longitudinal distance deviation value to guide the operator to move the calibration device 20 along the longitudinal center line O of the vehicle 30.

As can be understood, in some embodiments, after step 450 is finished, steps 410 to 450 are repeated, so that the calibration device 20 is aligned with the vehicle 30 more accurately.

As compared with the prior art, in the method for aligning a calibration device with a vehicle based on a wheel aligner provided by this embodiment, the position of the calibration device 20 and the position of the vehicle 30 are determined by using the wheel aligner 10; the computer 15 determines the adjusting mode of the calibration device 20 based on the position of the vehicle 30 and the position of the calibration device 20 and may guide an operator to conveniently and accurately align the calibration device 20 with the vehicle 30 according to an anticipated position or direction.

Finally, it should be noted that the foregoing embodiments are merely used to describe the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for aligning a calibration device with a vehicle based on a wheel aligner, wherein:
   the wheel aligner comprises at least one image sensor and a computer communicatively connected to the at least one image sensor;
   the method comprises the following steps:
   controlling, by the computer, the at least one image sensor to image a vehicle-mounted target on the vehicle, and processing the obtained image to determine a position of the vehicle;

controlling, by the computer, the at least one image sensor to image a reference target on the calibration device, and processing the obtained image to determine a position of the calibration device; and determining, by the computer, an adjusting mode of the calibration device based on the position of the vehicle and the position of the calibration device, so that the calibration device is aligned with the vehicle according to an anticipated position or direction;

wherein the at least one image sensor comprises at least one first image sensor and at least one second image sensor; and wherein:

the step of controlling, by the computer, the at least one image sensor to image a vehicle-mounted target on the vehicle, and processing the obtained image to determine a position of the vehicle comprises: controlling, by the computer, the at least one first image sensor to capture a first image from the vehicle-mounted target on the vehicle, and processing the first image to determine the position of the vehicle; and the step of controlling, by the computer, the at least one image sensor to image a reference target on the calibration device, and processing the obtained image to determine a position of the calibration device comprises: controlling, by the computer, the at least one second image sensor to capture a second image from the reference target on the calibration device, and processing the second image to determine the position of the calibration device;

wherein the wheel aligner comprises a bracket; and the at least one first image sensor and the at least one second image sensor are mounted on the bracket;

wherein the at least one first image sensor is disposed at both ends of the bracket, and the at least one second image sensor is disposed at middle of the bracket; and the reference target on the calibration device is disposed on the side of the calibration device departed from the vehicle and facing the bracket.

2. The method according to claim 1, wherein the wheel aligner comprises a bracket, and the at least one image sensor is disposed at two ends of the bracket; and two ends of the transverse support shaft of the calibration device are respectively provided with two reference targets, and the transverse support shaft of the calibration device is used for bearing the calibration component.

3. The method according to claim 2, wherein the step of controlling, by the computer, the at least one image sensor to image a reference target on the calibration device, and processing the obtained image to determine a position of the calibration device comprises:

determining, by the computer, positions of the reference targets on two ends of the transverse support shaft of the calibration device; and determining, by the computer, a center point of the calibration device and/or a position of the transverse support shaft of the calibration device according to the positions of the reference targets on the two ends.

4. The method according to claim 3, wherein the step of determining, by the computer, a center point of the calibration device and/or a position of the transverse support shaft according to the positions of the reference targets on the two ends comprises:

determining, by the computer, positions of the two ends of the transverse support shaft of the calibration device according to the positions of the reference targets on the two ends of the transverse support shaft; and determining, by the computer, the center point of the calibration device and/or the position of the transverse support shaft according to the positions of the two ends of the transverse support shaft.

5. The method according to claim 1, wherein the step of controlling, by the computer, the at least one second image sensor to capture a second image from the reference target on the calibration device, and processing the second image to determine the position of the calibration device comprises:

determining, by the computer, a position of a reference point in the second image of the reference target relative to the second image sensor; and determining, by the computer, a position of a center of the calibration device relative to the second image sensor according to the position of the reference point in the second image of the reference target relative to the second image sensor and a position correspondence between the reference point and a center of the calibration device.

6. The method according to claim 5, wherein the step of controlling, by the computer, the at least one first image sensor to capture a first image from the vehicle-mounted target on the vehicle, and processing the first image to determine the position of the vehicle comprises:

determining, by the computer, a position of the vehicle-mounted target relative to the first image sensor according to the first image of the on-mounted target;

determining, by the computer, the position of the vehicle relative to the first image sensor according to the position of the on-mounted target relative to the first image sensor; and determining, by the computer, the position of the vehicle relative to the second image sensor according to the position of the vehicle relative to the first image sensor and the position of the first image sensor relative to the second image sensor.

7. The method according to claim 5, wherein the step of controlling, by the computer, the at least one second image sensor to capture a second image from the reference target on the calibration device, and processing the second image to determine the position of the calibration device comprises:

controlling, by the computer, the at least one second image sensor to image different position states of the reference target on the calibration device to obtain at least two second images of the reference object; and determining a position of a transverse support shaft of the calibration device based on the at least two second images of the reference target;

wherein the reference target presents different position states around the transverse support shaft of the calibration device, and the transverse support shaft of the calibration device is configured to bear a calibration component.

8. The method according to claim 1, wherein the step of controlling, by the computer, the at least one second image sensor to capture a second image from the reference target on the calibration device, and processing the second image to determine the position of the calibration device comprises:

controlling, by the computer, the at least one second image sensor to image different position states of the reference target on the calibration device to obtain at least two second images of the reference object; and determining a position of a transverse support shaft of the calibration device based on the at least two second images of the reference target;

wherein the reference target presents different position states around the transverse support shaft of the calibration device, and the transverse support shaft of the calibration device is configured to bear a calibration component.

9. The method according to claim 8, wherein the step of controlling, by the computer, the at least one first image sensor to capture a first image from the vehicle-mounted target on the vehicle, and processing the first image to determine the position of the vehicle comprises:

determining, by the computer, a position of the vehicle-mounted target relative to the first image sensor according to the first image of the on-mounted target;

determining, by the computer, the position of the vehicle relative to the first image sensor according to the position of the on-mounted target relative to the first image sensor; and determining, by the computer, the position of the vehicle relative to the second image sensor according to the position of the vehicle relative to the first image sensor and the position of the first image sensor relative to the second image sensor.

10. A calibration system, comprising:

a wheel aligner, comprising at least one image sensor and a computer communicatively connected to the at least one image sensor; and a calibration device, comprising a reference target;

wherein:

the computer is configured to control the at least one image sensor to image a vehicle-mounted target on a vehicle, and process the obtained image to determine a position of the vehicle;

the computer is further configured to control the at least one image sensor to image a reference target on the calibration device, and process the obtained image to determine a position of the calibration device; and the computer is further configured to determine an adjusting mode of the calibration device based on the position of the vehicle and the position of the calibration device, so that the calibration device is aligned with the vehicle according to an anticipated position or direction;

wherein the wheel aligner comprises a bracket;

the at least one image sensor comprises at least two first image sensors and at least one second image sensor;

the at least two first image sensor are disposed at two ends of the bracket;

the at least one second image sensor is disposed in the middle of the bracket; and the reference target on the calibration device is disposed on the side of the calibration device departed from the vehicle and facing the bracket.

11. The calibration system according to claim 10, wherein the wheel aligner comprises a bracket;

the two image sensors are respectively disposed at two ends of the bracket;

a transverse support shaft of the calibration device is provided with a reference target;

the transverse support shaft of the calibration device is configured to bear a calibration component; and the reference target presents different position states around the transverse support shaft of the calibration device.

12. The calibration system according to claim 10, wherein the wheel aligner comprises a bracket;

the two image sensors are respectively disposed at two ends of the bracket;

two ends of a transverse support shaft of the calibration device are respectively provided with two reference targets, and the transverse support shaft of the calibration device is configured to bear a calibration component.

13. The calibration system according to claim 10, wherein the wheel aligner comprises a bracket;

the at least one image sensor is disposed at the bracket and is movable with respect to the bracket; and the reference target on the calibration device is disposed on the side of the calibration device departed from the vehicle and facing the bracket.

14. The calibration system according to claim 10, wherein the wheel aligner comprises a bracket;

the at least one image sensor is disposed at the bracket and is movable with respect to the bracket;

a transverse support shaft of the calibration device is provided with a reference target;

the transverse support shaft of the calibration device is configured to bear a calibration component; and the reference target presents different position states around the transverse support shaft of the calibration device.

15. The calibration system according to claim 10, wherein the wheel aligner comprises a bracket;

the at least one image sensor is disposed at the bracket and is movable with respect to the bracket; and two ends of a transverse support shaft of the calibration device are respectively provided with two reference targets, and the transverse support shaft of the calibration device is configured to bear a calibration component.

* * * * *